US012189320B2

(12) United States Patent
Suzuki

(10) Patent No.: US 12,189,320 B2
(45) Date of Patent: Jan. 7, 2025

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Shinya Suzuki, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/464,319

(22) Filed: Sep. 11, 2023

(65) Prior Publication Data

US 2024/0085839 A1 Mar. 14, 2024

(30) Foreign Application Priority Data

Sep. 13, 2022 (JP) ................................ 2022-145523

(51) Int. Cl.
*G03G 15/00* (2006.01)
*G03G 15/01* (2006.01)
*G03G 15/32* (2006.01)

(52) U.S. Cl.
CPC ......... *G03G 15/55* (2013.01); *G03G 15/0115* (2013.01); *G03G 15/32* (2013.01); *G03G 15/5041* (2013.01); *G03G 15/5062* (2013.01); *G03G 2215/00569* (2013.01)

(58) Field of Classification Search
CPC ............... G03G 15/0155; G03G 15/32; G03G 15/5041; G03G 15/5062; G03G 15/55
USPC ........................................................... 399/12
See application file for complete search history.

(56) References Cited

U.S. PATENT DOCUMENTS 8,116,640 B2 * 2/2012 Zona ................. G03G 15/5033 399/26
2007/0237399 A1 10/2007 Satonaga et al.

FOREIGN PATENT DOCUMENTS

JP 2007281959 A 10/2007

* cited by examiner

*Primary Examiner* — Hoan H Tran
(74) *Attorney, Agent, or Firm* — ROSSI, KIMMS & McDOWELL LLP

(57) ABSTRACT

In the image forming method, a halftone image is generated by performing halftone processing for an input image, a scanned image of a printed material on which on which the halftone image is printed is obtained, and a failure component of an image forming apparatus is identified based on a difference between the scanned image and the input image. In the generation, the halftone image is generated by representing a dot pattern of a halftone portion in a case where the input image is a test image for the failure diagnosis by a dot pattern whose frequency is relatively higher than that of a dot pattern that is applied to the halftone portion in a case where the input image is an image other than the test image.

14 Claims, 13 Drawing Sheets

IMAGE FORMING APPARATUS, CONTROL METHOD OF IMAGE FORMING APPARATUS, AND STORAGE MEDIUM

BACKGROUND

Field

The present disclosure relates to a technique to diagnose a failure of an image forming apparatus.

Description of the Related Art

There is a technique to diagnose a failure of an image forming apparatus. Japanese Patent Laid-Open No. 2007-281959 has disclosed a technique to determine a test chart for diagnosing a failure causing an image defect by calculating a feature value from information on a difference between read image information on an output image and basic image information and in accordance with the type of failure based on the calculated feature value.

SUMMARY

Incidentally, in a failure diagnosis technique, a diagnosis with higher accuracy is performed, and therefore, it is required to stably identify an image defect having occurred. Note that due to the occurrence of an image defect in a halftone image portion in a test chart, there is a case where the image defect changes by a dot pattern formed in halftone processing. The change in the image defect such as this may occur also in the technique of Japanese Patent Laid-Open No. 2007-281959 described above.

The image forming apparatus according to one aspect of the present disclosure is an image forming apparatus having a failure diagnosis function, the image forming apparatus including: a generating unit configured to generate a halftone image by performing halftone processing for an input image; an obtaining unit configured to obtain a scanned image of a printed material on which the halftone image is printed; and an identification unit configured to identify a failure component of the image forming apparatus based on a difference between the scanned image and the input image, wherein the generating unit generates the halftone image by representing a dot pattern of a halftone portion in a case where the input image is a test image for the failure diagnosis by a dot pattern whose frequency is relatively higher than that of a dot pattern that is applied to the halftone portion in a case where the input image is an image other than the test image.

Further features of the present disclosure will become apparent from the following description of exemplary embodiments with reference to the attached drawings.

DESCRIPTION OF THE EMBODIMENTS

In the following, with reference to the attached drawings, embodiments of the technique of the present disclosure will be explained in detail. The following embodiments are not intended to limit the technique of the present disclosure according to the claims and all combinations of features explained in the present embodiments are not necessarily indispensable to the solution of the technique of the present disclosure. To the same component, the same reference number is attached and explanation is omitted.

In the following explanation, an externa controller is sometimes called an image processing controller, a digital frontend, a print server, and a DEF. The image forming apparatus is sometimes called a multi-function peripheral and an MFP.

First Embodiment

[Printing System]

Figure 1:
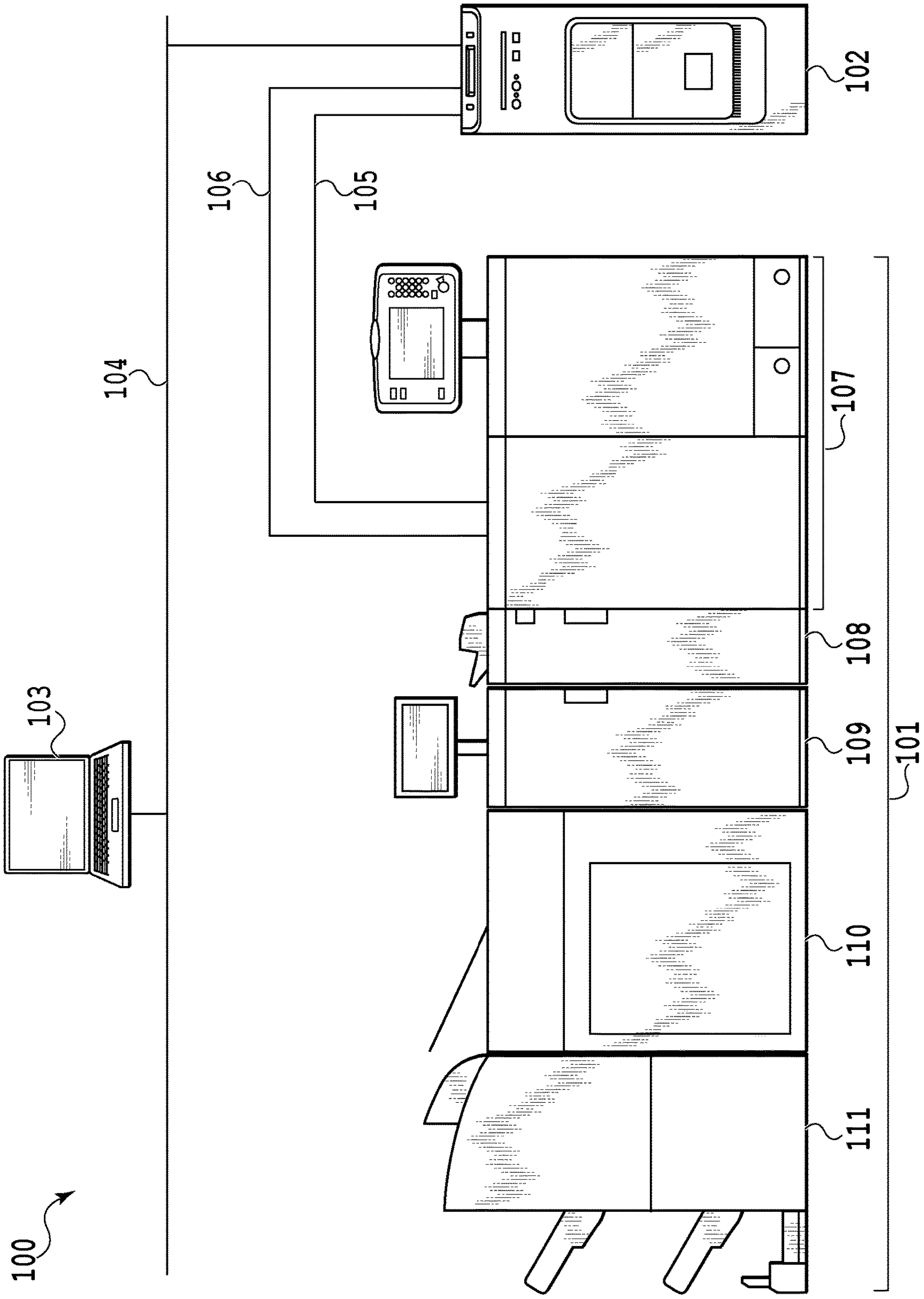
FIG. 1 is a diagram showing a network configuration example including a printing system.

FIG. 1 is a diagram showing a network configuration example of a printing system (image processing system) according to the present embodiment. As shown in FIG. 1, a printing system 100 includes an image forming apparatus 101 and an external controller 102. The image forming apparatus 101 and the external controller 102 are connected so as to be capable of communication via an internal LAN 105 and a video cable 106. The external controller 102 is connected with a client PC 103 so as to be capable of communication via an external LAN 104.

It is possible for the client PC 103 to give printing instructions to the external controller 102 via the external LAN 104. In the client PC 103, a printer driver is installed, which has a function to convert print processing-target image data into page description language (PDL) that the external controller 102 can process. It is possible for a user who desires to perform printing to give printing instructions from various applications installed in the client PC 103 via the printer driver by operating the client PC 103. The printer driver transmits PDL data, which is print data, to the external controller 102 based on the printing instructions from a user. Upon receipt of the PDL data from the client PC 103, the external controller 102 analyzes and interprets the received PDL data. By performing rasterization processing based on results of the interpretation, generating a bitmap image (print image data) with a resolution in accordance with the image forming apparatus 101, and inputting a print job to the image forming apparatus 101, printing instructions are given. The resolution of the image forming apparatus is normally 600 dpi and 1,200 dpi in a high-definition mode in many cases. In the following, explanation is given by taking an example in which the resolution is 600 dpi.

Next, the image forming apparatus 101 is explained. The image forming apparatus 101 is configured so that devices having a plurality of different functions are connected and complicated print processing, such as bookbinding, can be performed. The image forming apparatus 101 has a printing module 107, an inserter 108, an inspection module 109, a stacker 110, and a finisher 111. In the following, each module is explained.

The printing module 107 prints an image in accordance with a print job and discharges a printed printing material. The printed printing material discharged from the printing module 107 is conveyed inside each device in order of the inserter 108, the inspection module 109, the stacker 110, and the finisher 111. In the present embodiment, though the image forming apparatus 101 of the printing system 100 is one example of an image forming apparatus, there is a case where the printing module 107 included in the image forming apparatus 101 is referred to as an image forming apparatus.

The printing module 107 forms (prints) an image on a printing material using toner (developing agent), which is fed and conveyed from a sheet feed unit arranged at the bottom of the printing module 107. The inserter 108 is a device that inserts a partitioning printing material and the like for separating a series of printing material groups conveyed from the printing module 107, for example, at an arbitrary position. The inspection module 109 is a device that inspects a print defect of a printed printing material on which an image is printed by the printing module 107 and which is conveyed through a conveyance path. Specifically, the inspection module 109 determines whether or not the image printed on the printed printing material is normal and inspects the presence/absence of a print defect by reading the image printed on the printed printing material, which is conveyed, and comparing the obtained read image with a reference image registered in advance. The stacker 110 is a device capable of stacking a large number of printed printing materials. The finisher 111 is a device capable of performing finishing processing, such as stapling processing, punching processing, and saddle stitching bookbinding processing, for the printed printing material that is conveyed. The printing material processed by the finisher 111 is discharged onto a predetermined sheet discharge tray.

In the configuration example in FIG. 1, though the external controller 102 is connected to the image forming apparatus 101, it is also possible to apply the present embodiment to a configuration different from the above. For example, it may also be possible to use a configuration in which the image forming apparatus 101 is connected to the external LAN 104 and print data is transmitted from the client PC 103 to the image forming apparatus 101 without intervention of the external controller 102. In this case, the data analysis and rasterization for the print data are performed by the image forming apparatus 101.

Figure 2:
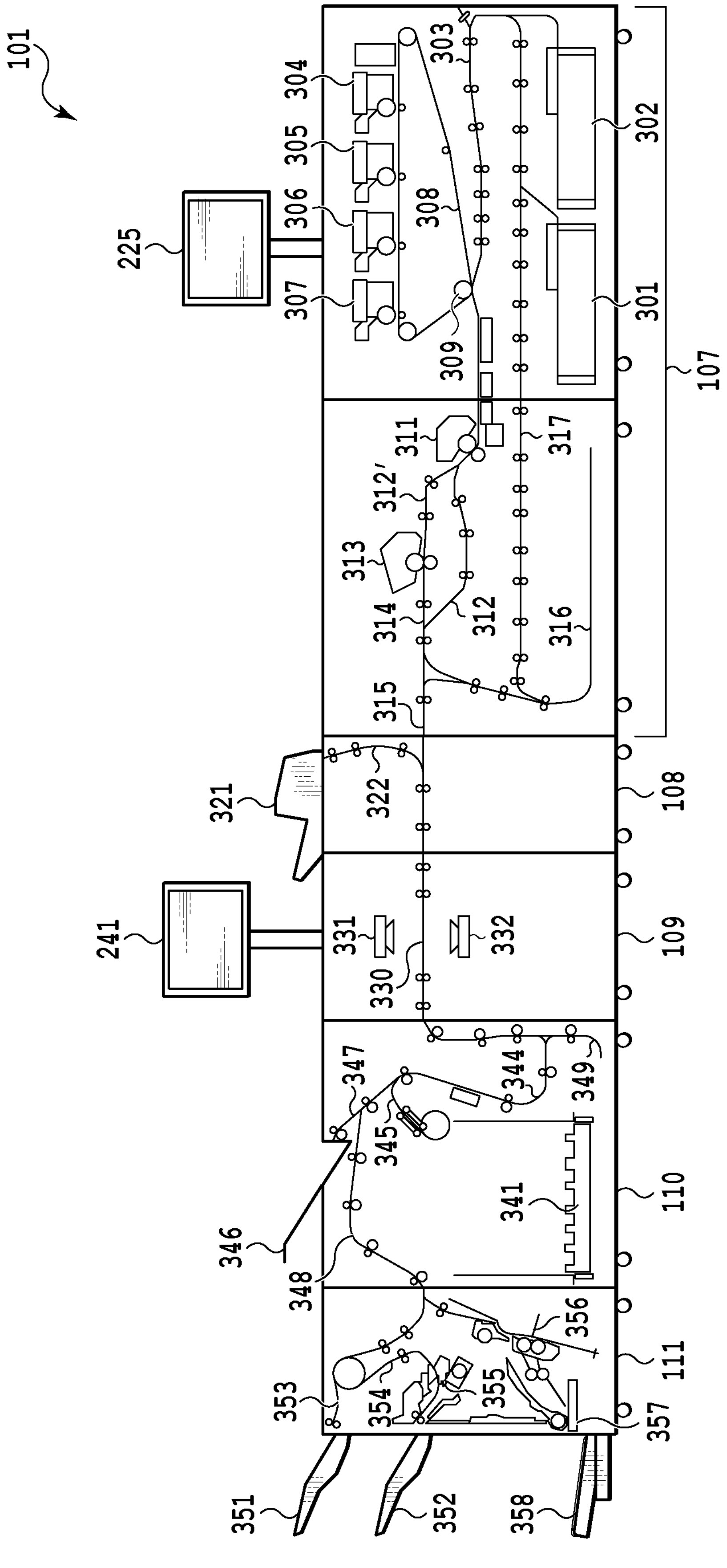
FIG. 2 is a cross-sectional diagram showing a hardware configuration example of an image forming apparatus.

FIG. 2 is a cross-sectional diagram showing a hardware configuration example of the image forming apparatus 101. In the following, with reference to FIG. 2, a specific operation example of the image forming apparatus 101 is explained.

In the printing module 107, in sheet feed decks 301 and 302, various printing materials are stored. Among the printing materials stored in each sheet feed deck, the printing material located at the uppermost position is separated one by one and fed to a conveyance path 303. Each of image forming stations 304 to 307 includes a photoconductor drum (photoconductor body) and forms a toner image on the photoconductor drum by using toner whose color is different from one another. Specifically, each of the image forming stations 304 to 307 forms a toner image by using toner of yellow (Y), magenta (M), cyan (C), and black (K), respectively.

The toner image of each color formed in the image forming stations 304 to 307 is superimposed one on another in order and transferred onto an intermediate transfer belt 308 (primary transfer). The toner image transferred onto the intermediate transfer belt 308 is conveyed up to a secondary transfer position 309 in accordance with the rotation of the intermediate transfer belt 308. At the secondary transfer position 309, onto the printing material conveyed through the conveyance path 303, the toner image is transferred from the intermediate transfer belt 308 (secondary transfer). The printing material for which the secondary transfer has been performed is conveyed to a fixing unit 311. The fixing unit 311 comprises a pressure roller and a heating roller. By heat and pressure being applied to the printing material while the printing material passes between these rollers, fixing processing to fix the toner image onto the printing material is performed. The printing material having passed through the fixing unit 311 is conveyed to a connection point 315 between the printing module 107 and the inserter through a conveyance path 312. In this manner, a color image is formed (printed) on the printing material.

In a case where further fixing processing is necessary depending on the type of printing material, the printing material having passed through the fixing unit 311 is guided to a conveyance path 314 provided with a fixing unit 313. The fixing unit 313 performs further fixing processing for the printing material that is conveyed through the conveyance path 314. The printing material having passed through the fixing unit 313 is conveyed to the connection point 315. Further, in a case where the operation mode in which double-sided printing is performed is set, the printing material on the first side of which an image is printed and which is conveyed through the conveyance path 312 or the conveyance path 314 is guided to a reversing path 316. The printing material reversed in the reversing path 316 is guided to a double-sided conveyance path 317 and conveyed up to the secondary transfer position 309. Due to this, at the secondary transfer position 309, a toner image is transferred onto the second side opposite to the first side of the printing material. After that, by the printing material passing through the fixing unit 311 (and the fixing unit 313), the formation of a color image on the second side of the printing material is completed.

The printed printing material for which the formation (printing) of an image in the printing module 107 has been completed and which has been conveyed up to the connection point 315 is conveyed into the inside of the inserter 108. The inserter 108 comprises an inserter tray 321 on which a printing material to be inserted is set. The inserter 108 performs processing to insert a printing material fed from the inserter tray 321 into an arbitrary insertion position in a series of printed printing material groups conveyed from the printing module 107 and convey to the device in the subsequent stage (inspection module 109). The printed printing material having passed through the inserter 108 is conveyed in order to the inspection module 109.

The inspection module 109 comprises image reading units 331 and 332 each having a CIS (Contact Image Sensor) on a conveyance path 330 through which the printed printing material from the inserter 108 is conveyed. The image reading units 331 and 332 are arranged at positions facing each other via the conveyance path 330. The image reading units 331 and 332 are configured to read the front side (first side) and the back side (second side) of the printing material, respectively. The image reading unit may be configured by, for example, a CCD (Charge Coupled Device) and a line scan camera, in place of CIS.

The inspection module 109 performs defect inspection processing to inspect the image printed on the printed printing material that is conveyed through the conveyance path 330. Specifically, the inspection module 109 performs reading processing to read the image of the printed printing material by using the image reading units 331 and 332 at the timing at which the printed printing material that is being conveyed reaches a predetermined position. Further, the inspection module 109 inspects the image printed on the printing material based on the image obtained by the reading processing. The printing material having passed through the inspection module 109 is conveyed in order to the stacker 110.

In the present embodiment, the inspection module 109 performs processing to inspect a print defect by comparing the read image obtained by reading the image printed on the printed printing material and the reference image registered in advance. As the image comparison method in the defect inspection processing, for example, there are a method of comparing pixel values of each pixel and a method of comparing positions of an object obtained by edge detection. Further, there is a method that uses extraction of character data by OCR (Optical Character Recognition). Further, the inspection module 109 performs defect inspection processing for an inspection item set in advance. As the inspection item, for example, there are print misalignment in an image, image hue, image density, streak or fading that occurs in an image, missing print dots and the like.

The stacker 110 comprises a stack tray 341 as a tray on which a printed printing material is stacked, which is conveyed from the inspection module 109 arranged on the upstream side in the direction of conveyance of the printed printing material. The printed printing material having passed through the inspection module 109 is conveyed through a conveyance path 344 within the stacker 110. By the printed printing material that is conveyed through the conveyance path 344 being guided to a conveyance path 345, the printed printing material is stacked on the stack tray 341.

The stacker 110 further comprises an escape tray 346 as a sheet discharge tray. In the present embodiment, the escape tray 346 is used to discharge the printed printing material determined to have abnormality in the printed image as a result of the defect inspection by the inspection module 109. By the printed printing material that is conveyed through the conveyance path 344 being guided to a conveyance path 347, the printed printing material is conveyed to the escape tray 346. The printed printing material that is conveyed without being stacked or discharged in the stacker 110 is conveyed to the finisher 111 in the subsequent stage through a conveyance path 348.

The stacker 110 further comprises a reversing unit 349 for reversing the orientation of the printed printing material that is conveyed. The reversing unit 349 is used, for example, for making the orientation of the printing material that is input to the stacker 110 the same as the orientation of the printed printing material in a case where the printing material is stacked on the stack tray 341 and output from the stacker 110. For the printed printing material that is conveyed to the finisher 111 without being stacked in the stacker 110, the reversing operation by the reversing unit 349 is not performed.

The finisher 111 performs the finishing function designated by a user for the printed printing material conveyed from the inspection module 109 that is arranged on the upstream side in the conveyance direction of the printed printing material. In the present embodiment, the finisher 111 has the finishing function, for example, such as the stapling function (one-portion or two-portion stapling), the punching function (two-hole or three-hole punching), and the saddle stitching bookbinding function. The finisher 111 comprises two sheet discharge trays 351 and 352. In a case where the finishing processing by the finisher 111 is not performed, the printed printing material conveyed to the finisher 111 is discharged onto the sheet discharge tray 351 through a sheet conveyance path 353. In a case where the finishing processing, such as stapling processing, is performed by the finisher 111, the printed printing material conveyed to the finisher 111 is guided to a conveyance path 354. The finisher 111 performs the finishing processing designated by a user for the printed printing material that is conveyed through the conveyance path 354 by using a processing unit 355 and discharges the printed printing material for which the finishing processing has been performed onto the sheet discharge tray 352.

[Control Unit]

Figure 3:
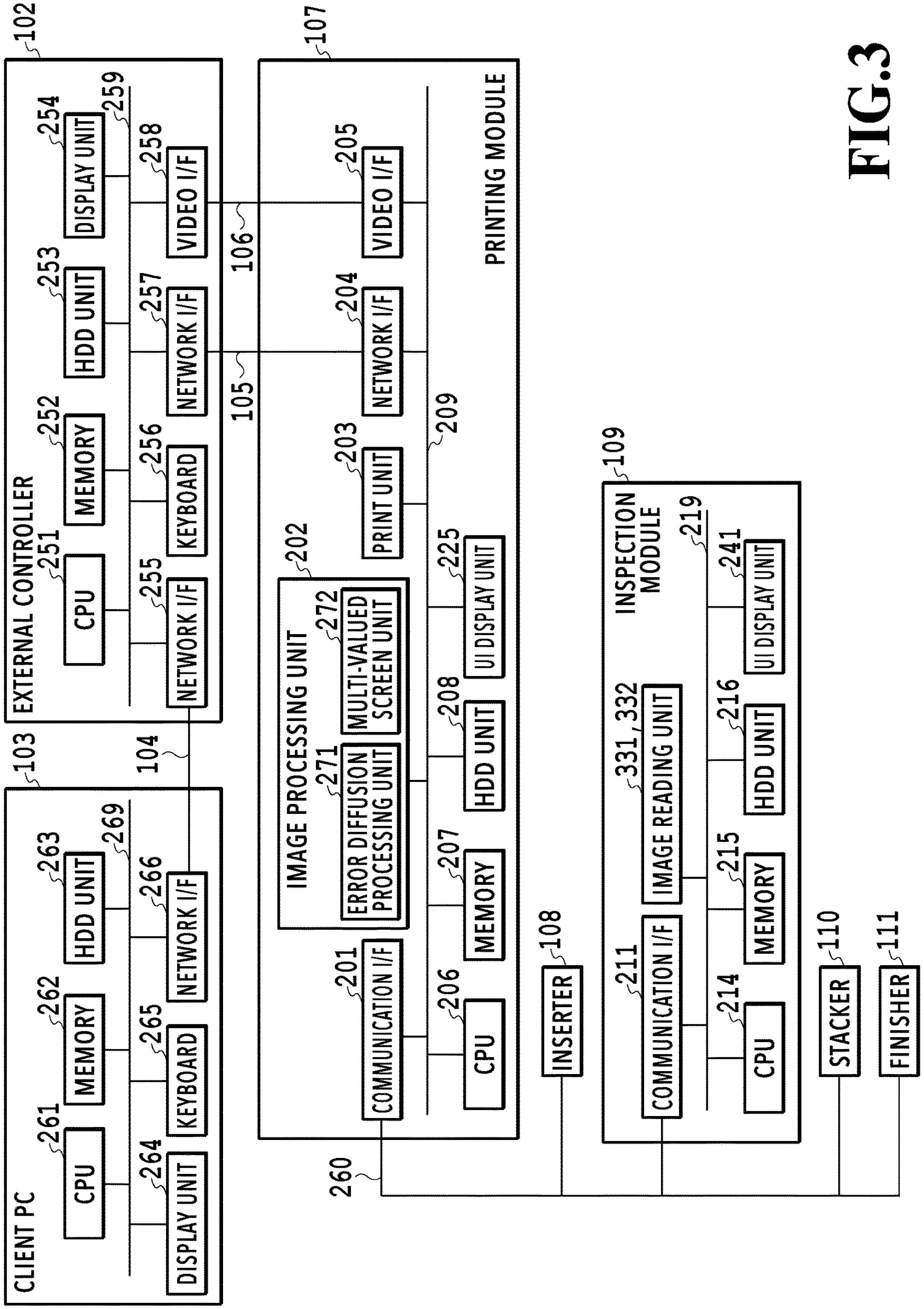
FIG. 3 is a block diagram showing an internal configuration of the image forming apparatus, an external controller, and a client PC.

FIG. 3 is a schematic function block diagram of the image forming apparatus 101, the external controller 102, and the client PC 103. The printing module 107 of the image forming apparatus 101 comprises a communication I/F (interface) 201, a network I/F 204, a video I/F 205, a CPU 206, a memory 207, an HDD unit 208, and a UI display unit 225. The printing module 107 further comprises an image processing unit 202 and a print unit 203. These devices are respectively connected so as to be capable of transmission and reception of data with one another via a system bus 209.

The communication I/F 201 is connected with the inserter 108, the inspection module 109, the stacker 110, and the finisher 111 via a communication cable 260. The CPU 206 performs communication for controlling each device via the communication I/F 201. The network I/F 204 is connected with the external controller 102 via the internal LAN 105 and used for communication of control data and the like. The video I/F 205 is connected with the external controller 102 via the video cable 106 and used for communication of data, such as image data. The printing module 107 (image forming apparatus 101) and the external controller 102 may be connected by only the video cable 106 as long as it is possible for the external controller 102 to control the operation of the image forming apparatus 101.

In the HDD unit 208, various programs or data is stored. The CPU 206 controls the operation of the entire printing module 107 by executing programs stored in the HDD unit 208. In the memory 207, programs and data necessary at the time of the CPU 206 performing various types of processing are stored. The memory 207 operates as a work area of the CPU 206. The UI display unit 225 receives instructions to input various settings and perform operations from a user and is used to display various types of information, such as setting information and a processing situation of a print job.

The inserter 108 controls insertion of a printing material that is fed from the sheet feed unit and conveyance of a printing material that is conveyed from the printing module 107.

The inspection module 109 comprises a communication I/F 211, a CPU 214, a memory 215, an HDD unit 216, the image reading units 331 and 332, and a UI display unit 241. These devices are connected so as to be capable of transmission and reception of data with one another via a system bus 219. The communication I/F 211 is connected with the printing module 107 via the communication cable 260. The CPU 214 performs communication necessary to control the inspection module 109 via the communication I/F 211. The CPU 214 controls the operation of the inspection module 109 by executing control programs stored in the memory 215. In the memory 215, control programs for the inspection module 109 are stored.

The image reading units 331 and 332 read the image (sample) of a conveyed printing material in accordance with instructions of the CPU 214. The CPU 214 performs processing to store the image read by the image reading units 331 and 332 in the HDD unit 216 as a reference image for defect inspection. The CPU 214 further performs defect inspection processing to compare the inspection image read by the image reading units 331 and 332 and the reference image for defect inspection stored in the HDD unit 216 and inspect the image printed on the printing material based on the comparison results. Though the example is explained in which the image read by the image reading units 331 and 332 is used as the reference image for defect inspection, the example is not limited to this. It is also possible to store in advance a bitmap image obtained by rasterizing PDL data in the HDD unit 216 as a reference image for defect inspection and use the image for defect inspection processing.

The UI display unit 241 is used to display defect inspection results, a setting screen and the like. An operation unit is used also as the UI display unit 241, operated by a user, and receives, for example, setting change of the inspection module 109 and various instructions, such as instructions to register a reference image for defect inspection and instructions to perform an image diagnosis. In the HDD unit 216, various types of setting information and image data necessary for defect inspection are stored. It is possible to reuse the various types of setting information and image data stored in the HDD unit 216.

The stacker 110 performs control to discharge the printed printing material conveyed through the conveyance path onto the stack tray or onto the escape tray, or convey the printed printing material to the finisher 111 connected on the downstream side in the conveyance direction of the printed printing material.

The finisher 111 controls conveyance and sheet discharge of a printed printing material and performs finishing processing, such as stapling, punching, or saddle stitching bookbinding.

The external controller 102 comprises a CPU 251, a memory 252, an HDD unit 253, a keyboard 256, a display unit 254, network I/Fs 255 and 257, and a video I/F 258. These devices are connected so as to be capable of transmission and reception of data with one another via a system bus 259. The CPU 251 controls the operation of the entire external controller 102, for example, such as reception of print data from the client PC 103, RIP processing, and transmission of print data to the image forming apparatus 101, by executing programs stored in the HDD unit 253. In the memory 252, programs and data necessary at the time of the CPU 251 performing various types of processing are stored. The memory 252 operates as a work area of the CPU 251.

In the HDD unit 253, various programs and data are stored. The keyboard 256 is used to input instructions to operate the external controller 102 from a user. The display unit 254 is, for example, a display and used to display information on an application being executed in the external controller 102, and an operation screen. The network I/F 255 is connected with the client PC 103 via the external LAN 104 and used for communication of data, such as printing instructions. The network I/F 257 is connected with the image forming apparatus 101 via the internal LAN 105 and used for communication of data, such as printing instructions. The external controller 102 is configured so as to be capable of communicating with the printing module 107, the inserter 108, the inspection module 109, the stacker 110, and the finisher 111 via the internal LAN 105 and the communication cable 260. The video I/F 258 is connected with the image forming apparatus 101 via the video cable 106 and used for communication of data, such as image data (print data).

The client PC 103 comprises a CPU 261, a memory 262, an HDD unit 263, a display unit 264, a keyboard 265, and a network I/F 266. These devices are connected so as to be capable of transmission and reception of data with one another via a system bus 269. The CPU 261 controls the operation of each device via the system bus 269 by executing programs stored in the HDD unit 263. Due to this, various types of processing by the client PC 103 are implemented. For example, the CPU 261 generates print data and gives printing instructions by executing a document processing program stored in the HDD unit 263. In the memory 262, programs and data necessary at the time of the CPU 261 performing various types of processing are stored. The memory 262 operates as a work area of the CPU 261.

In the HDD unit 263, for example, various applications, such as a document processing program, programs, such as a printer driver, and various types of data are stored. The display unit 264 is, for example, a display and used to display information on an application being executed in the client PC 103 and an operation screen. The keyboard 265 is used to input instructions to operate the client PC 103 from a user. The network I/F 266 is connected with the external controller 102 so as to be capable of communication via the external LAN 104. The CPU 261 communicates with the external controller 102 via the network I/F 266.

In the configuration example in FIG. 1, though the external controller 102 is connected to the image forming apparatus 101, it is also possible to apply the present embodiment to a configuration different from the configuration in FIG. 1. For example, it may also be possible to use a configuration in which the image forming apparatus 101 is connected to the external LAN 104 and print data is transmitted from the client PC 103 to the image forming apparatus 101 without intervention of the external controller 102. In this case, data analysis, interpretation, and rasterization for the print data are performed by the image forming apparatus 101.

[Defect Inspection Processing]

Figure 4:
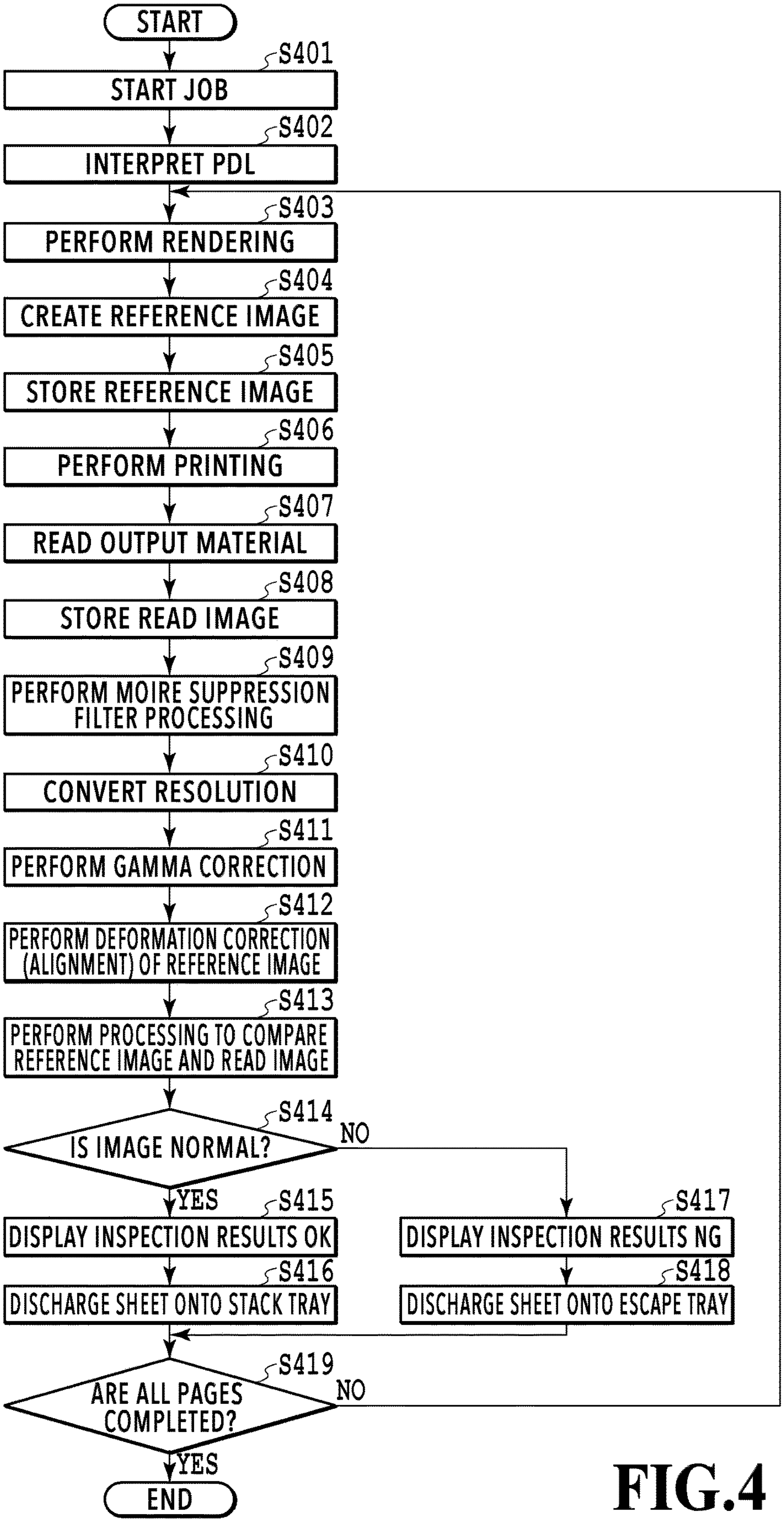
FIG. 4 is a flowchart showing a procedure of a printing operation and defect inspection processing of a printed material.

Defect inspection processing according to the present embodiment is explained by using the drawings. FIG. 4 is a flowchart showing the print operation that is performed by the printing module 107 and the procedure of the defect inspection processing of a printed material, which is performed by the inspection module 109. FIG. 4 shows the entire flow from the work before the start of inspection until execution of inspection. A symbol "S" in the explanation of the flowchart means a step. This is also the same with the explanation of the following flowcharts. The processing at each step in FIG. 4 is performed by the CPU 206 of the printing module 107 and the CPU 214 of the inspection module 109. In the present embodiment, as printing setting, setting to designate the stacker 110 as the sheet discharge destination of a printed material (that is, setting to designate the stack tray 341 of the stacker 110 as the sheet discharge destination) is performed in advance.

At S401, printing instructions from the client PC 103 or the external controller 102 are received and the print operation is started. That is, a print job is started. In the present embodiment, for simplification of explanation, PDL data is assumed to be PDF (Portable Document Format) including a character image and the following explanation is given by an example in which the external controller 102 is instructed to perform direct print of the PDF.

At S402, the CPU 251 of the external controller 102 performs, by the print job of the PDF received at S401, PDL interpretation of the font type and size of the character, the designated position of the sheet and the like from the description within the PDF file.

At S403, the CPU 251 rasterizes PDF data into a bitmap in accordance with the resolution setting as interpreted by the PDL interpretation at S402. At S404, the CPU 251 creates the rasterized bitmap as a reference image. At S405, the CPU 251 temporarily stores the reference image created at S404 in the HDD unit 253 of the external controller 102. After that, the reference image stored in the HDD unit 253 is sent to the inspection module 109 and stored in the HDD unit 216 of the inspection module 109. The following explanation is given on the assumption that the resolution of the reference image is 600 dpi.

At S406, the CPU 251 transmits the rasterized bitmap data from the video I/F 258 to the video I/F 205 of the printing module 107 through the video cable 106. The CPU 206 of the printing module 107, which has received the bitmap data, performs printing in the print unit 203.

At S407, the CPU 214 of the inspection module 109 performs processing to read the printed material that is printed by the image reading units 331 and 332. At S408, the CPU 214 stores the read image obtained by the reading at S407 in the HDD unit 216 of the inspection module 109 as an inspection image. In the present embodiment, the following explanation is given on the assumption that the resolution at the time of the image reading units 331 and 332 reading the printed material that is printed is 600 dpi.

At S409, the CPU 214 performs filter processing for suppressing the occurrence of moire for the read image of the printed material obtained by the reading at S407. This processing is performed so that the low-frequency components are left by suppressing the high-frequency pattern and the interference fringe (moire) does not occur at the time of performing resolution conversion.

At S410, CPU 214 performs processing to convert resolution for the read image of the printed material for which the filter processing has been performed. Due to this, the resolution of the read image of the printed material for which the filter processing has been performed is converted to 300 dpi. The converted resolution is determined based on deformation correction (alignment) of the reference image at S412, which is performed later, the computing time of the comparison processing between the reference image and the read image at 413, and the size of an image defect desired to be detected. At S411, the CPU 214 performs gamma correction using a lookup table stored in the memory 215 of the inspection module 109 so that the gradation of the reference image created at S404 matches that of the read image into which converted at S410.

At S412, the CPU 214 of the inspection module 109 performs the deformation correction of the reference image and performs alignment of the read image and the reference image for which the deformation correction has been performed at S412. At S413, the CPU 214 performs processing to compare the read image obtained at S407 (that is, obtained by reading the image printed on the printing material) and the reference image for which the deformation correction has been performed at S412.

Figure 5A:
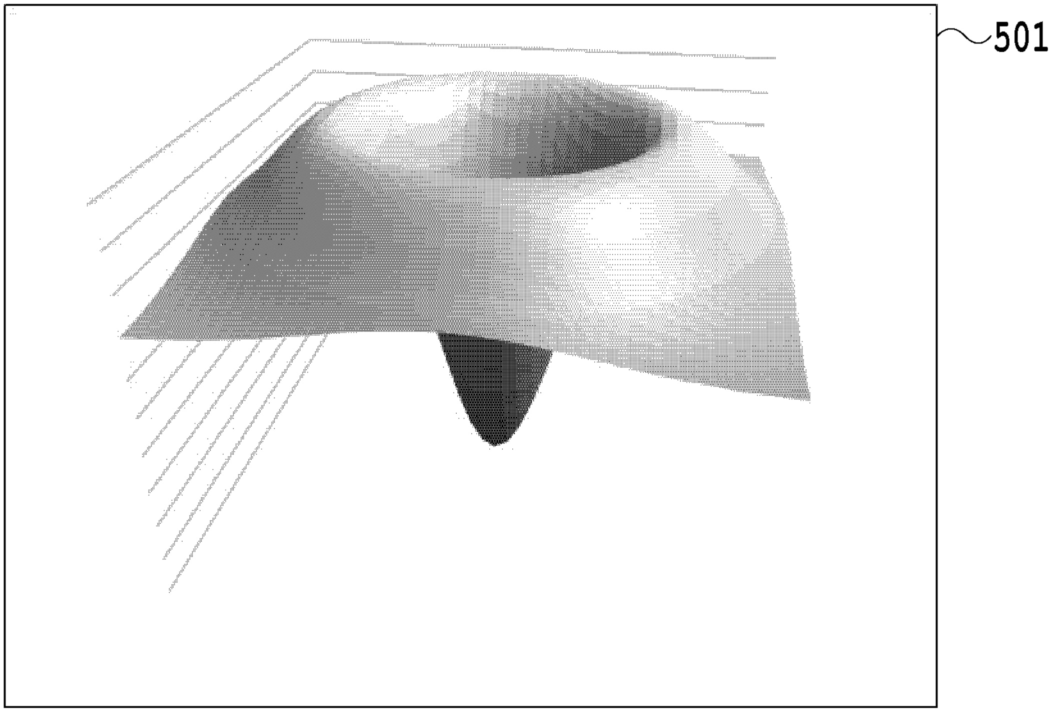
FIG. 5A and FIG. 5B are diagrams showing a filter for emphasizing a spot-shaped defect and a filer for emphasizing a linear defect, respectively.
Figure 5B:
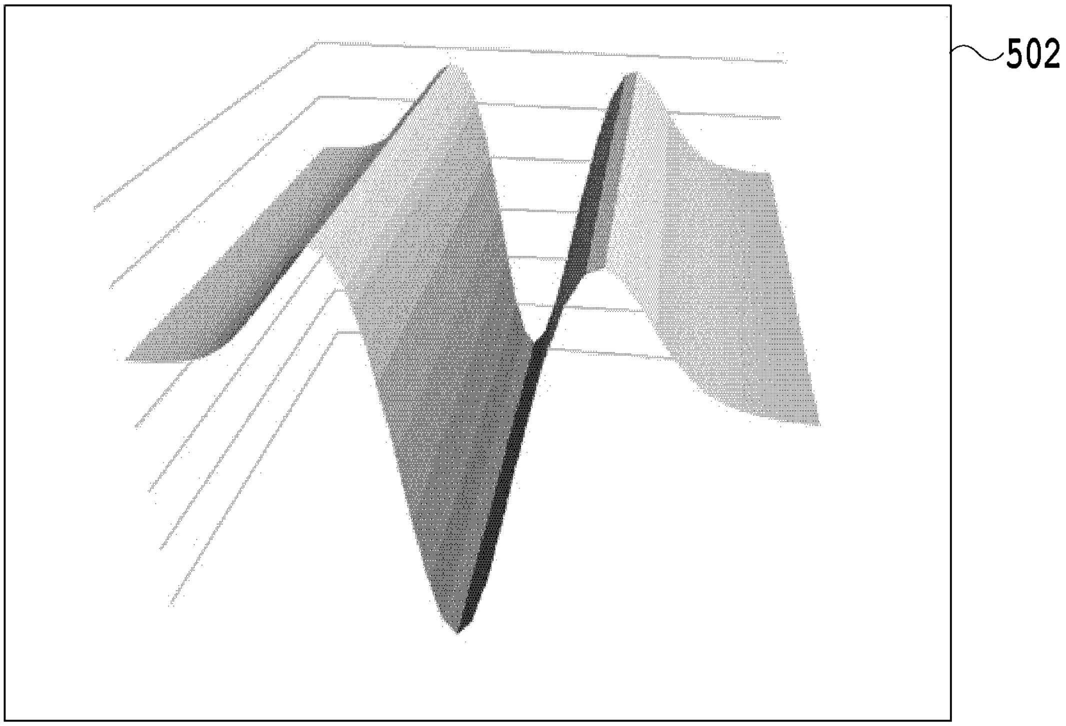

In a case where the image comparison processing is completed, at S414, the CPU 214 determines whether or not the printed image is normal based on the results of the comparison with the reference image by the comparison processing. The determination is performed as follows. First, for the difference image between the reference image and the read image, filter processing for emphasizing a specific shape is performed. The filter processing for emphasizing a specific shape is explained by using the drawings. FIG. 5A and FIG. 5B are each a diagram for explaining an example of the filter processing for emphasizing a specific shape, and FIG. 5A shows a filter example for emphasizing a spot-shaped defect and FIG. 5B shows a filter example for emphasizing a linear defect. For the difference image for which the emphasis processing such as this has been performed, binarization processing is performed so that in a case where the difference value is a numerical value exceeding a threshold value, the pixel value is "1" and in a case where the difference value is a numerical value less than or equal to the threshold value, the pixel value is "0". Then, whether or not a pixel whose difference value exceeds the threshold value and whose pixel value is "1" exists in the image for which the binarization processing has been performed. In a case where determination results that such a pixel does not exist are obtained, the image is determined to be normal and in a case where determination results that such a pixel exists are obtained, the image is determined not to be normal. Note that the defect inspection processing (inspection processing) is not limited to the above-described method and as long as it is possible for a user to detect a desired defect by processing, the type of processing is not limited.

In a case where the CPU 214 obtains the determination results that the printed image is normal (YES at S414), the processing is moved to S415. At S415, the CPU 214 displays "Inspection results OK", which is the defect inspection results indicating that the printed image is normal, on the UI display unit 241 of the inspection module 109. Then, at S416, the CPU 214 instructs the printing module 107 to discharge the printed material onto the stack tray 341 of the stacker 110. Then, the printing module 107 instructs the stacker 110 to discharge the conveyed printed material onto the stack tray 341 based on the instructions from the inspection module 109.

On the other hand, in a case where the CPU 214 obtains the determination results that the printed image is not normal (there is abnormality in the image) (NO at S414), the processing is moved to S417. At S417, the CPU 214 displays "Inspection results NG", which is the defect inspection results indicating that the printed image is not normal, on the UI display unit 241 of the inspection module 109. Then, at S418, the CPU 214 instructs the printing module 107 to discharge the printed material onto the escape tray 346 of the stacker 110. Then, the printing module 107 instructs the stacker 110 to discharge the conveyed printed material onto the escape tray 346 based on the instructions from the inspection module 109.

At S419, the CPU 214 determines whether the printing of all the pages and the defect inspection processing are completed. In a case where the CPU 214 obtains determination results that the printing of all the pages and the defect inspection processing are not completed (NO at S419), the processing is returned to S403. Then, the CPU 206 of the printing module 107 and the CPU 214 of the inspection module 109 continue the processing at S403 to S418. On the other hand, in a case where the CPU 214 obtains a signal indicating that the printing of all the pages and the defect inspection processing are completed (YES at S419), the print processing and the defect inspection processing by the procedure in FIG. 4 are terminated. That is, the flow shown in FIG. 4 is terminated.

[Image Diagnosis Processing]

Figure 6:
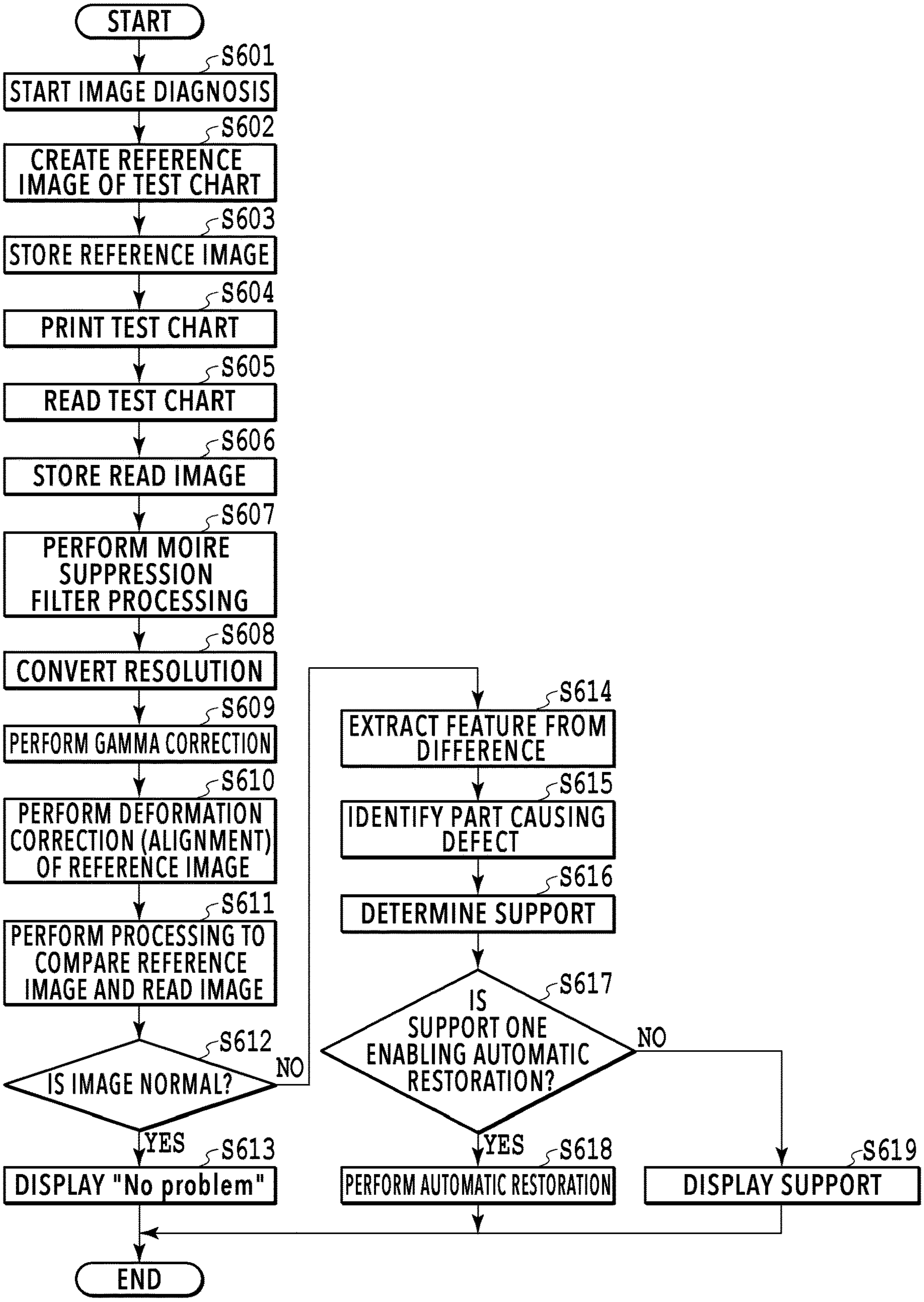
FIG. 6 is a flowchart showing a procedure of image diagnosis processing.

Image diagnosis processing according to the present embodiment is explained by using the drawing. FIG. 6 is a flowchart showing a procedure of the image diagnosis processing according to the present embodiment.

At S601, upon receipt of instructions to diagnose an image from a user or a service person via the UI display unit 241 that is used also as the operation unit, the printing system 100 starts the image diagnosis processing. At S602, the CPU 251 of the external controller 102 reads a test chart stored in advance and rasterizes the test chart into a bitmap and creates the bitmap obtained by rasterizing the test chart as a reference image. The test chart is an image (in the following, also called test image) for diagnosing a failure of the image forming apparatus. At S603, the CPU 251 temporarily stores the reference image of the test chart, which is created at S602, in the HDD unit 253 of the external controller 102. After that, the reference image of the test chart stored in the HDD unit 253 is sent to the inspection module 109 and stored in the HDD unit 216 of the inspection module 109. The following explanation is given on the assumption that the resolution of the reference image of the test chart is 600 dpi.

At S604, the CPU 251 transmits the bitmap data of the rasterized test chart to the video I/F 205 of the printing module 107 from the video I/F 258 through the video cable 106. The CPU 206 of the printing module 107 performs halftone processing for the bitmap data of the test chart received by the video I/F 205 and in the print unit 203, based on the image data for which the halftone processing has been performed, performs printing of the test chart. Details of the halftone processing will be described later.

At S605, the CPU 214 of the inspection module 109 performs processing to read the printed test chart by the image reading units 331 and 332. At S606, the CPU 214 stores the read image of the test chart obtained by the reading at S605 in the HDD unit 216 of the inspection module 109 as the inspection image. In the present embodiment, the following explanation is given on the assumption that the resolution at the time of the image reading units 331 and 332 reading the printed test chart is 600 dpi.

At S607, the CPU 214 performs filter processing for suppressing the occurrence of moire for the read image of the printed material (test chart) obtained by the reading at S605. At S608, the CPU 214 performs processing to convert resolution for the read image of the printed material (test chart) for which the filter processing has been performed. Due to this, the resolution of the read image of the printed material (test chart) for which the filter processing has been performed is converted to 300 dpi. At S609, the CPU 214 performs gamma correction processing using a lookup table stored in the memory 215 of the inspection module 109 so that the gradation of the reference image created at S602 matches that of the read image into which converted at S608.

At S610, the CPU 214 performs deformation correction of the reference image and performs alignment of the read image and the reference image for which the deformation correction has been performed at S610. At S611, the CPU 214 performs processing to compare the reference image of the test chart and the read image, whose conditions, such as resolution, have been matched. In a case where the image comparison processing is completed, at S612, the CPU 214 determines whether or not the printed image (test chart image) is normal based on the comparison results of the reference image and the read image by the comparison processing, as in the defect inspection processing.

In a case where the CPU 214 obtains determination results that the printed image is normal (YES at S612), the processing is moved to S613. At S613, the CPU 214 displays the image diagnosis results indicating that there is no problem on the UI display unit 241 of the inspection module 109. For example, the CPU 214 displays "No problem". On the other hand, in a case where the CPU 214 obtains determination results that the printed image is not normal (there is a defect in the image) (NO at S612), the processing is moved to S614. At S614, the CPU 214 performs feature extraction for the image defect that remains as the difference data in a case where the comparison processing of the reference image and the read image is performed at S611. As the feature information on the image defect, which is obtained by the extraction processing, for example, there are color information indicating that the color is a single color, such as yellow, magenta, cyan, and black, or a multicolor that occurs in a plurality of colors, contrast information indicating the density of a defect, and information indicating the size, whether the shape is vertically elongated, and the like. Further, there are coordinate information indicating the position in the direction perpendicular to the conveyance direction of the test chart within the printing module 107, periodicity information indicating that the defect of the similar feature occurs periodically in the conveyance direction of the test chart within the printing module 107, and the like.

At S615, the CPU 214 identifies a part that is the cause of the image defect in the printing module 107 and the inspection module 109 based on the feature information on the image defect, which is obtained at S614. At S616, the CPU 214 determines support for the image defect based on the part that is the cause identified at S615. The support is divided into support enabling automatic restoration and support not enabling automatic restoration. The support enabling automatic restoration includes, for example, support enabling automatic restoration by the printing module 107, such as cleaning of a wire and grid of a corona charger, which is a charging unit of the photoconductor drum provided in the image forming stations 304 to 307 of the printing module 107. The support not enabling automatic restoration includes, for example, support that requires the work of a user, such as cleaning of the stain on the reading surface of the image reading units 331 and 332 of the inspection module 109 or adjustment of the printing material that is used, support that requires the work of a service person, such as the exchange of parts, and the like. Further, the support not enabling automatic restoration includes, for example, support for fiber and foreign matter included in the printing material before an image is formed.

Following the above, at S617, the CPU 214 determines whether the support determined at S616 is support enabling automatic restoration. In a case where the CPU 214 obtains determination results that the determined support is support enabling automatic restoration (YES at S617), the processing is moved to S618. At S618, the CPU 214 performs automatic restoration control corresponding to the cause of the image defect. On the other hand, in a case where the CPU 214 obtains determination results that the determined support is not support enabling automatic restoration (NO at S617), the processing is returned to S619. At S619, the CPU 214 displays the image diagnosis results and a method of performing support on the UI display unit 241 of the inspection module 109. In a case where one of the processing at S613, S618, and S619 described above is completed, the flow (image diagnosis processing) shown in FIG. 6 is terminated.

[Test Chart]

Figure 7A:
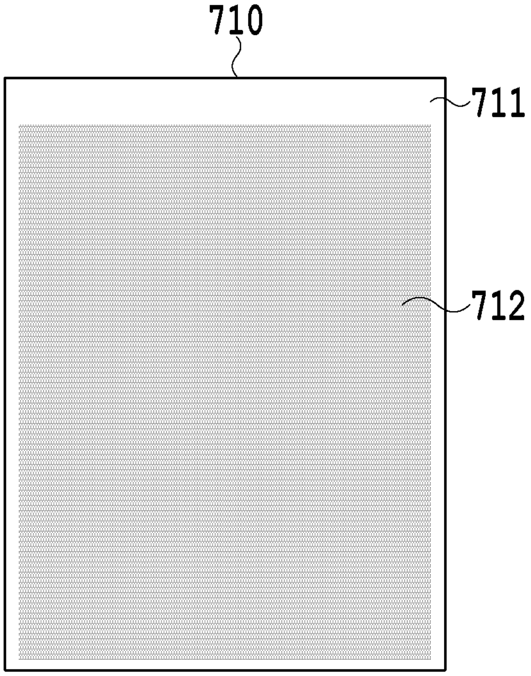
FIG. 7A to FIG. 7C are each a diagram showing an example of a test chart that is used in defect diagnose processing.
Figure 7B:
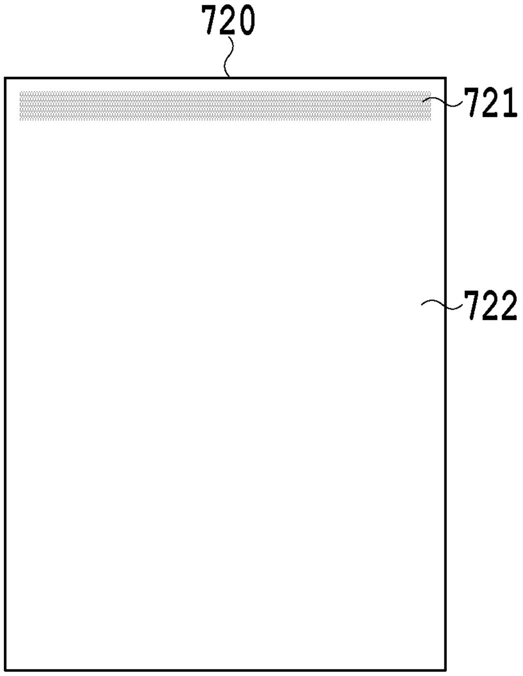
Figure 7C:
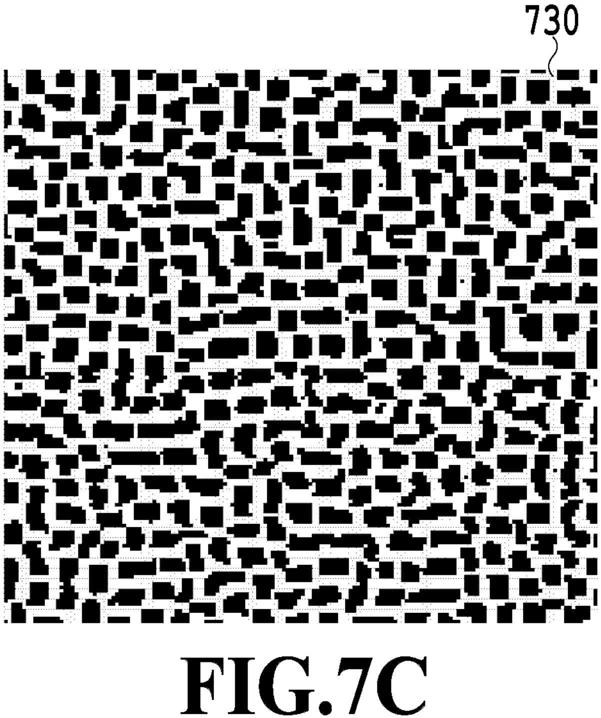

FIG. 7A to FIG. 7C are diagrams showing examples of test charts that are used in image diagnosis processing in the present embodiment and an example of image data for which halftone processing has been performed. FIG. 7A shows a first test chart of the two test charts. A first test chart 710 has a non-image portion 711 and a halftone image portion 712. The non-image portion 711 is an area located at the chart front end portion in the first test chart 710 in the conveyance direction and shows an area in which no image is formed. The halftone image portion 712 is an area located at the portion other than the chart front end portion in the first test chart 710 and shows an area in which an image represented in halftone is formed. Further, FIG. 7B shows a second test chart 720 of the two test charts. A second test chart 720 has a halftone image portion 721 and a non-image portion 722. The halftone image portion 721 is an area located at the chart front end portion in the second test chart 720 in the conveyance direction and shows an area in which an image represented in halftone is formed. The non-image portion 722 is an area located at the portion other than the chart front end portion in the second test chart 720 and shows an area in which no image is formed.

In the halftone image portions (in the following, also referred to as halftone portions) 712 and 721, an image defect in which the halftone density becomes low, a white void image defect, and an image defect in which the halftone density becomes high are inspected. Further, in the non-image portions 711 and 722, an image defect in which the density becomes high is inspected. Furthermore, in a case where a dark vertical streak occurs at the white portion, which is the non-image portions 711 and 722, and a vertical streak whose density becomes low occurs at the same position as that of the dark vertical streak in the direction perpendicular to the conveyance direction of the test chart in the halftone image portions 712 and 721, the part shown below is classified as the cause of the occurrence of the image defect. That is, the stain in the image reading units 331 and 332 is classified as the cause of the occurrence of the image defect. Further, in a case where an A3-size (297 mm×420 mm) printing material is used as a printing material that is used for the test chart, each portion is set to the size shown below. That is, the length of the non-image portion 711 of the first test chart 710 in the conveyance direction of the test chart is set to 35 mm, the length of the halftone image portion 712 in the conveyance direction of the test chart is set to 380 mm, and the length of the margin at the rear end is set to 5 mm. Further, the length of the margin at the front end of the second test chart 720 is set to 5 mm, the length of the halftone image portion 721 in the conveyance direction of the test chart is set to 30 mm, and the length of the non-image portion 722 in the conveyance direction of the test chart is set to 385 mm.

Next, halftone processing of the halftone image portion in the printing module 107 of the present embodiment is explained. The CPU 206 performs halftone processing for the image data of the test charts of YMCK in the image processing unit 202. The image processing unit 202 has an error diffusion processing unit 271 and a multi-valued screen unit 272 and performs error diffusion processing or multi-valued screen processing as halftone processing (also called dither processing) in accordance with the printing condition. In the present embodiment, it is possible for the image processing unit 202 to perform three types of image processing, that is, screen processing using a low screen ruling, screen processing using a high screen ruling, and error diffusion processing with a resolution of 1,200 dpi. Then, the CPU 206 performs image formation based on YMCK image data for which the halftone processing has been performed.

Figure 8C:
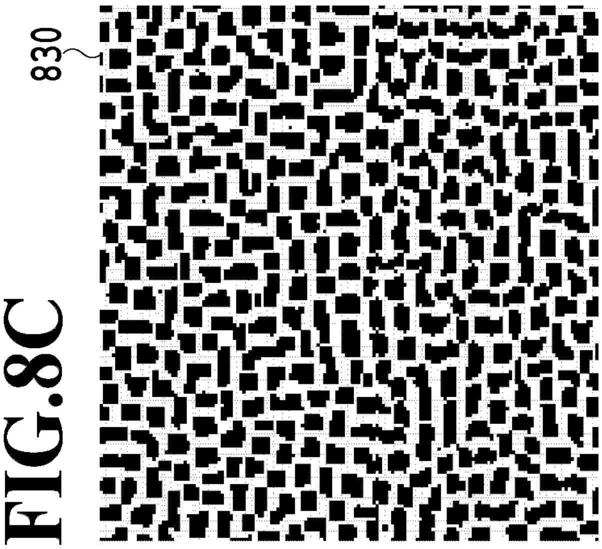
FIG. 8A to FIG. 8C are each a diagram showing a dot print pattern in an area having a unit area for each type of halftone processing of a black (K) image forming station of a printing module.
Figure 8B:
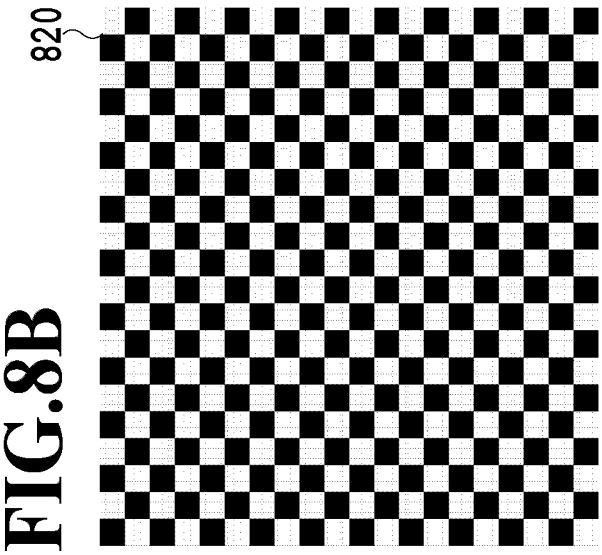
Figure 8A:
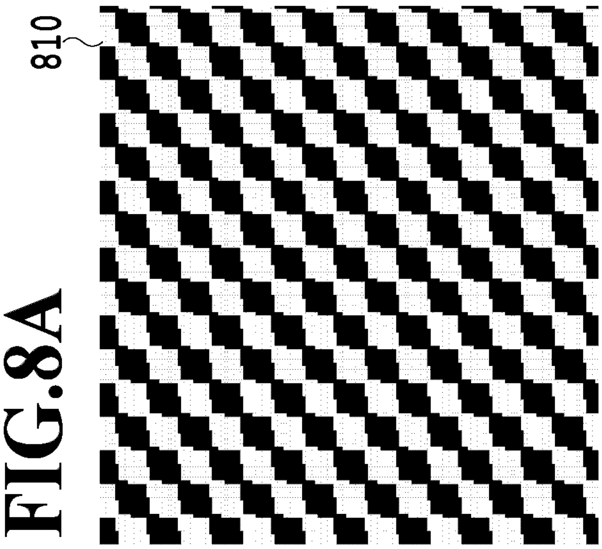

FIG. 8A to FIG. 8C are each a diagram showing a dot print pattern example in an area having a unit area for each type of halftone processing of the black (K) image forming station 307 of the printing module 107 in the present embodiment. FIG. 8A shows a dot print pattern corresponding to a low screen ruling, FIG. 8B shows a dot print pattern corresponding to a high screen ruling, and FIG. 8C show a dot print pattern of error diffusion. FIG. 8A corresponds to a dot screen whose screen angle is 45° and whose screen ruling is 170. FIG. 8B corresponds to a dot screen whose screen angle is 45° and whose screen ruling is 212 and FIG. 8C corresponds to error diffusion processing with a resolution of 1,200 dpi.

Further, in the printing module 107 of the present embodiment, the low screen rulings of yellow (Y), magenta (M), and cyan (C) are as shown below, respectively. That is, it is assumed that low screen rulings are a dot screen whose screen angle is 49° and whose screen ruling is 260, a dot screen whose screen angle is 67° and whose screen ruling is 185, and a dot screen whose screen angle is 23° and whose screen ruling is 185. Further, the high screen rulings of yellow (Y), magenta (M), and cyan (C) are as shown below, respectively. That is, it is assumed that the high screen rulings are a dot screen whose screen angle is 90° and whose screen ruling is 300, a dot screen whose screen angle is 61° and whose screen ruling is 230, and a dot screen whose screen angle is 29° and whose screen ruling is 230.

As shown in FIG. 8A to FIG. 8C, for the low screen ruling, the high screen ruling, and the error diffusion, the dot area and frequency in the dot print pattern per unit area are different. The low screen ruling performs image processing so that it is possible to perform transfer stably by increasing the area in which dots are adjacent in order to increase the density stability. The low screen ruling is suitable to graphics and images, such as a photo, and compared to a dot whose area is small, which is likely to scatter, the holding force of toner and the adhesive force with a printing material increase, and therefore, for example, in a case where a plurality of the same photos is printed by one image forming job or the like, it is possible to make a difference in tint unlikely to occur. In the printing module 107 of the present embodiment, the low screen ruling is applied to the image portion of a print image as the standard setting.

The high screen ruling is more suitable to a text image, such as a character and a thin line, than the low screen ruling because of the smaller area in which dots are adjacent and it is possible to improve the image quality of a fine edge portion and character. The dot area of the high screen ruling is smaller than that of the low screen ruling (number of dots is larger) and the frequency of the high screen ruling is also higher than that of the low screen ruling. In the printing module 107 of the present embodiment, the high screen ruling is applied to the text portion of a print image as the standard setting.

The error diffusion is image processing for suppressing an abnormal image from occurring in a case where the low screen ruling and the high screen ruling and the image pattern of the original image data interfere and an abnormal image is likely to occur, for example, at the time of copy printing and the like. That is, in a case of the low screen ruling, the high screen ruling and the like, though an abnormal image is likely to occur by the interference with the screen affected by the periodicity and image pattern of a document, it is possible to suppress this in a case of the error diffusion. In the error diffusion, for example, in a case where the resolution is 1,200 dpi or more, the dot area is further smaller than that of the high screen ruling, and therefore, it can be said that the frequency is high. In the printing module 107 of the present embodiment, the error diffusion with a resolution of 1,200 dpi is applied as the standard setting at the time of copy printing. Further, it is possible to change the setting for applying one of the above-described low screen ruling, the high screen ruling, and the error diffusion with a resolution of 1,200 dpi via a printing setting screen.

In the present embodiment, for the halftone image portions 712 and 721 of the test charts 710 and 720, a halftone whose image ratio of error diffusion is 50% as shown in FIG. 7C is used. The reason is explained based on FIG. 9A to FIG. 9C and FIG. 10A to FIG. 10C.

Figure 9A:
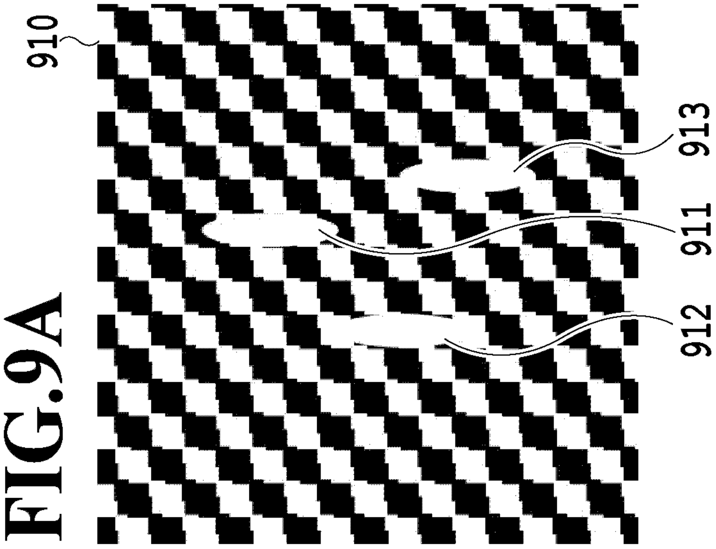
FIG. 9A to FIG. 9C are each a diagram showing an image example in which there is a white void image defect in a halftone image portion.
Figure 9B:
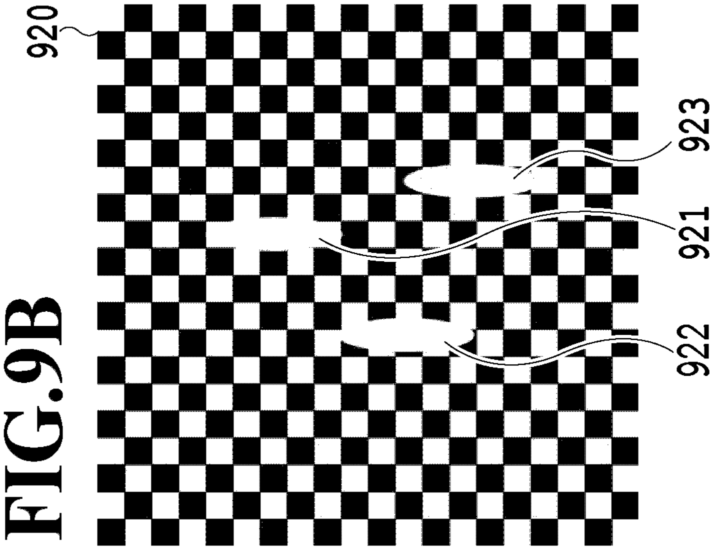
Figure 9C:
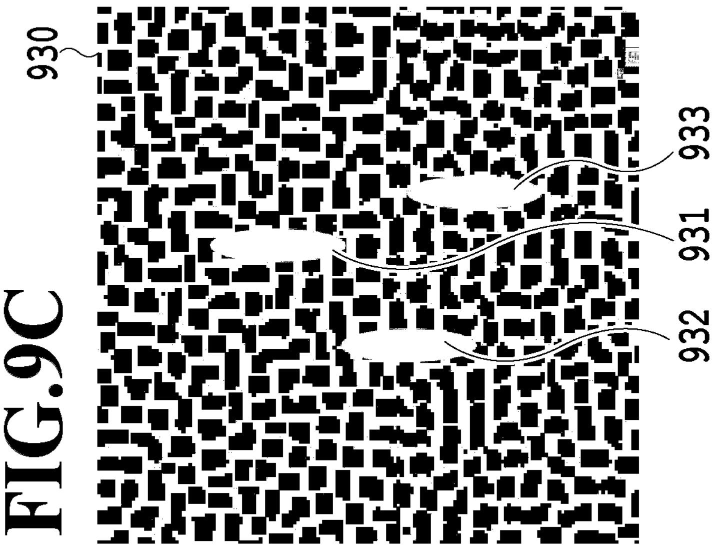

FIG. 9A to FIG. 9C are each a diagram showing a halftone image portion in which there is a white void image defect (in the following, called white spot-shaped defect). As in FIG. 8A to FIG. 8C, FIG. 9A shows a dot print pattern corresponding to a low screen ruling, FIG. 9B shows a dot print pattern corresponding to a high screen ruling, and FIG. 9C shows a dot print pattern of error diffusion.

In FIG. 9A to FIG. 9C, white spot-shaped defects 911, 912, 913, 921, 922, 923, 931, 932, and 933 are the same shape, which is a vertically elongated shape whose height is about 400 μm and whose width is about 100 μm.

In a 170-line dot screen image 910 shown in FIG. 9A, the diameter of a dot whose image ratio is 50% is about 106 μm. In a 212-line dot screen image 920 shown in FIG. 9B, the diameter of a dot whose image ratio is 50% is about 85 μm. In error diffusion in FIG. 9C, the dot size is further smaller than the diameter 85 μm.

Figures 10A, 10B, 10C:
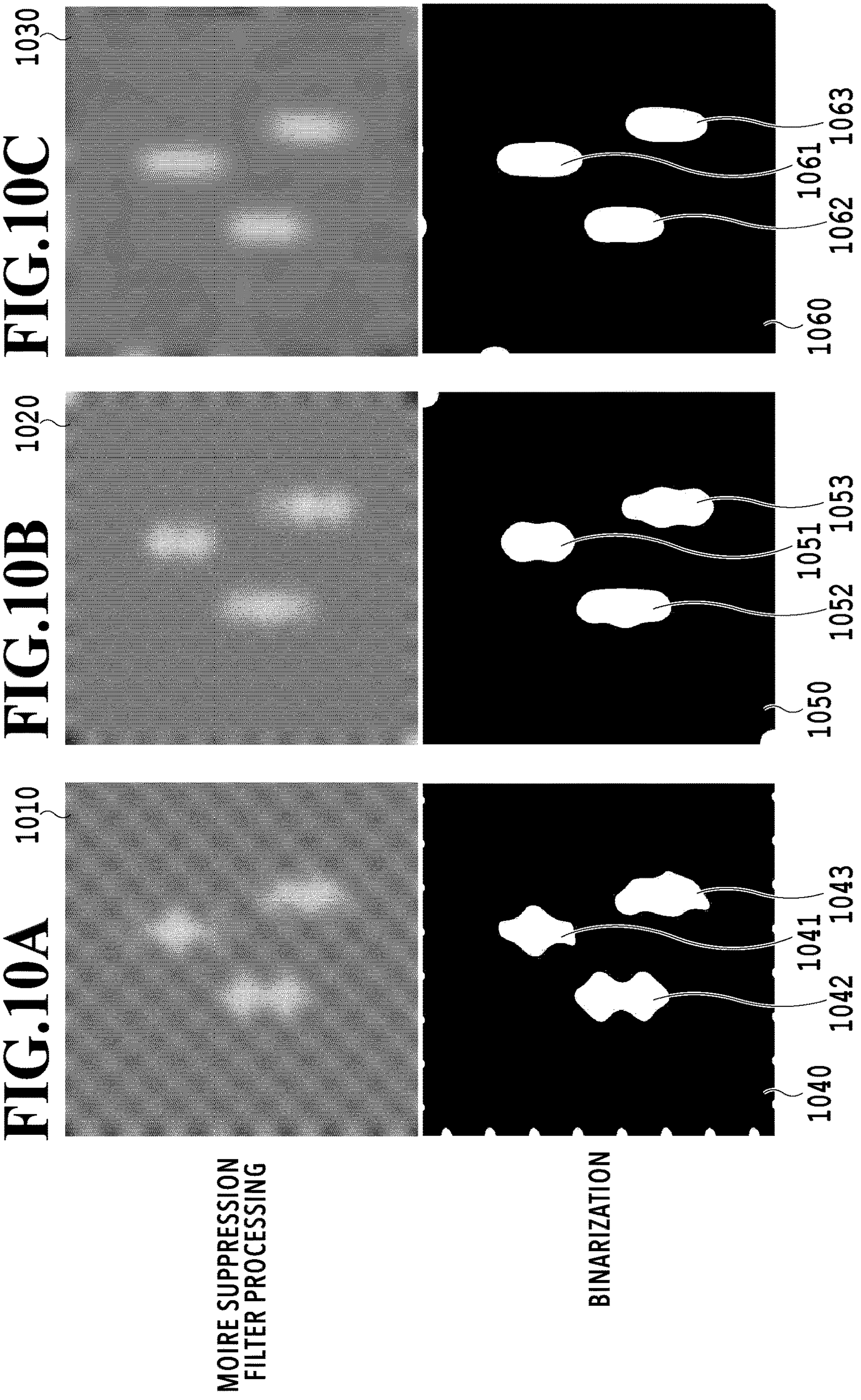
FIG. 10A to FIG. 10C are each a diagram showing an image example as a result of performing filter processing for suppressing the occurrence of moire for each image in FIG. 9A to FIG. 9C and further performing binarization processing.

FIG. 10A to FIG. 10C are diagrams showing images obtained by performing the filter processing for suppressing the occurrence of moire at S607 in the flowchart in FIG. 6 for the images whose screen types are different in FIG. 9A to FIG. 9C and further performing binarization processing. On the upper side in FIG. 10A, an image 1010 is shown, which is obtained by performing the filter processing for suppressing the occurrence of moire for the image 910 shown in FIG. 9A. On the upper side in FIG. 10B, an image 1020 is shown, which is obtained by performing the filter processing for suppressing the occurrence of moire for the image 920 shown in FIG. 9B. On the upper side in FIG. 10C, an image 1030 is shown, which is obtained by performing the filter processing for suppressing the occurrence of moire for an image 930 shown in FIG. 9C.

As shown in FIG. 10A, white spot-shaped defects in a 170-line dot screen halftone image 1040 have three types of shape shown below depending on the relative position with the screen dot, that is, variations are observed. Specifically, variations are observed, such as that there are a white void in the cross shape like a white spot-shaped defect 1041, a white void in the shape whose center portions are concave like a white spot-shaped defect 1042, and a white void in the shape having irregular protrusions on the lateral sides thereof like a white spot-shaped defect 1043. In contrast to this, in a 212-line dot screen halftone image 1050 as shown in FIG. 10B, it is confirmed that edge-shaped jaggies become smaller like white spot-shaped defects 1051, 1052, and 1053. Further, in the error diffusion in FIG. 10C, the change in shape of white spot-shaped defects 1061, 1062, and 1063 therein is further small and it is confirmed that the shape feature can be detected stably. Further, with respect to the area of the white spot-shaped defect, in the 170-line dot screen, it is confirmed that the area of the white spot-shaped defect 1042 is 1.39 times that of the white spot-shaped defect 1041, which is the smallest of the white spot-shaped defects 1041, 1042, and 1043 as shown in FIG. 10A. In the 212-line dot screen, it is confirmed that the area of the white spot-shaped defect 1052 is 1.20 times that of the white spot-shaped defect 1051, which is the smallest of the white spot-shaped defects 1051, 1052, and 1053 as shown in FIG. 10B. In the error diffusion, it is confirmed that the area of the white spot-shaped defect 1061 is 1.08 times that of the white spot-shaped defect 1063, which is the smallest of the white spot-shaped defects 1061, 1062, and 1063 and that the higher the frequency, the smaller the variations of the area become as shown in FIG. 10C.

In a case where the part that is the cause of an image defect in the printing module 107 is a body of revolution, such as the photoconductor drum or the intermediate transfer belt 308 provided in the image forming stations 304 to 307 in the above-described image diagnosis processing, there is a possibility that an image defect as shown below occurs. That is, there is a case where a liner or spot-shaped image defect occurs at each distance of the revolution period in the conveyance direction of a printing material. In a case where the image defect in the shape such as this occurs, by performing analysis of period for the image defect whose shape feature is the same or similar, the cause is identified. In a case where a plurality of white void linear or spot-shaped image defects occurs in the test charts 710 and 720, in the halftone image by the processing using a low screen ruling, the variations of the defect shape are likely to occur, and therefore, the accuracy of cause identification becomes low. In contrast to that, in the halftone image by the error diffusion with a resolution of 1,200 dpi or more, the variations of the defect shape are small, and therefore, it is possible to perform stable cause identification. Further, for a white void image defect that does not occur periodically, the defect shape is stable and it is easy to extract the feature, and therefore, the halftone image by the error diffusion with a resolution of 1,200 dpi or more is useful for cause identification.

Further, though the area of one dot is large in the halftone image by the processing using a low screen ruling, the area of one white portion is also large, and therefore, there is a case where it is not possible to detect a minute white void image defect on a condition that it is included in the white portion. In contrast to that, in the halftone image by the error diffusion with a resolution of 1,200 dpi or more, the portion represented by a dot pattern and the white portion are dispersed at a high frequency, and therefore, it is possible to stably detect a minute image defect.

In the present embodiment, test charts obtained by forming the test charts 710 and 720 shown in FIG. 7A and FIG. 7B in yellow, magenta, cyan, and black, respectively, are used.

[Effects]

The image diagnosis processing using halftone image data in which the halftone image portion of the test chart is represented by a dot pattern whose frequency is relatively high as explained above is performed at timing at which a defect is found in the defect inspection processing or the frequency of finding a defect increases. Due to this, it is possible to stably identify the cause of an image defect and by performing support therefor based on the identification results, it is possible to restore the operation of the printing system rather quickly. Further, by performing the image diagnosis processing at timing before a user starts printing, it is possible to stably discover an image defect and guarantee that there is no problem in the printing system.

Further, in the present embodiment, though the halftone image data obtained by performing the error diffusion processing with a resolution of 1,200 dpi or more for the halftone image portions 712 and 721 of the test charts 710 and 720 is used, the halftone image data is not limited to this. It may also be possible to use halftone image data obtained by performing screen processing using a high screen ruling of 212 or more. In this case, compared to a case where halftone image data obtained by performing screen processing using a low screen ruling of 170 and the like is used, it is possible to stably extract a defect shape, and therefore, useful. That is, halftone image data is generated by representing the dot pattern of the halftone portion in a case where the input image is test image data by a dot pattern whose frequency is relatively higher than the dot pattern that is applied to the halftone portion in a case where the input image is an image other than the test image. In the halftone image thus generated, it is possible to stably extract a defect shape, and therefore, useful.

Second Embodiment

The printing system according to the present embodiment is explained. In the first embodiment, the aspect is explained in which the error diffusion processing with a resolution of 1,200 dpi is used as the halftone processing of the halftone image portion of the test chart at the time of performing image diagnosis processing. In the present embodiment, an aspect is explained in which it is possible to select one of a standard diagnosis mode and a high-accuracy diagnosis mode in image diagnosis processing. The standard diagnosis mode is a mode in which screen processing using a screen a user uses for printing is performed. The high-accuracy diagnosis mode is a mode that is provided to a service person and in which screen processing using a screen whose frequency is higher than that of a screen a user uses for printing, or error diffusion processing with a predetermined resolution (for example, resolution is 1,200 dpi or more) is performed. The configuration of the printing system according to the present embodiment is the same as that of the first embodiment and explanation thereof is omitted.

[Image Diagnosis Processing]

Figure 11:
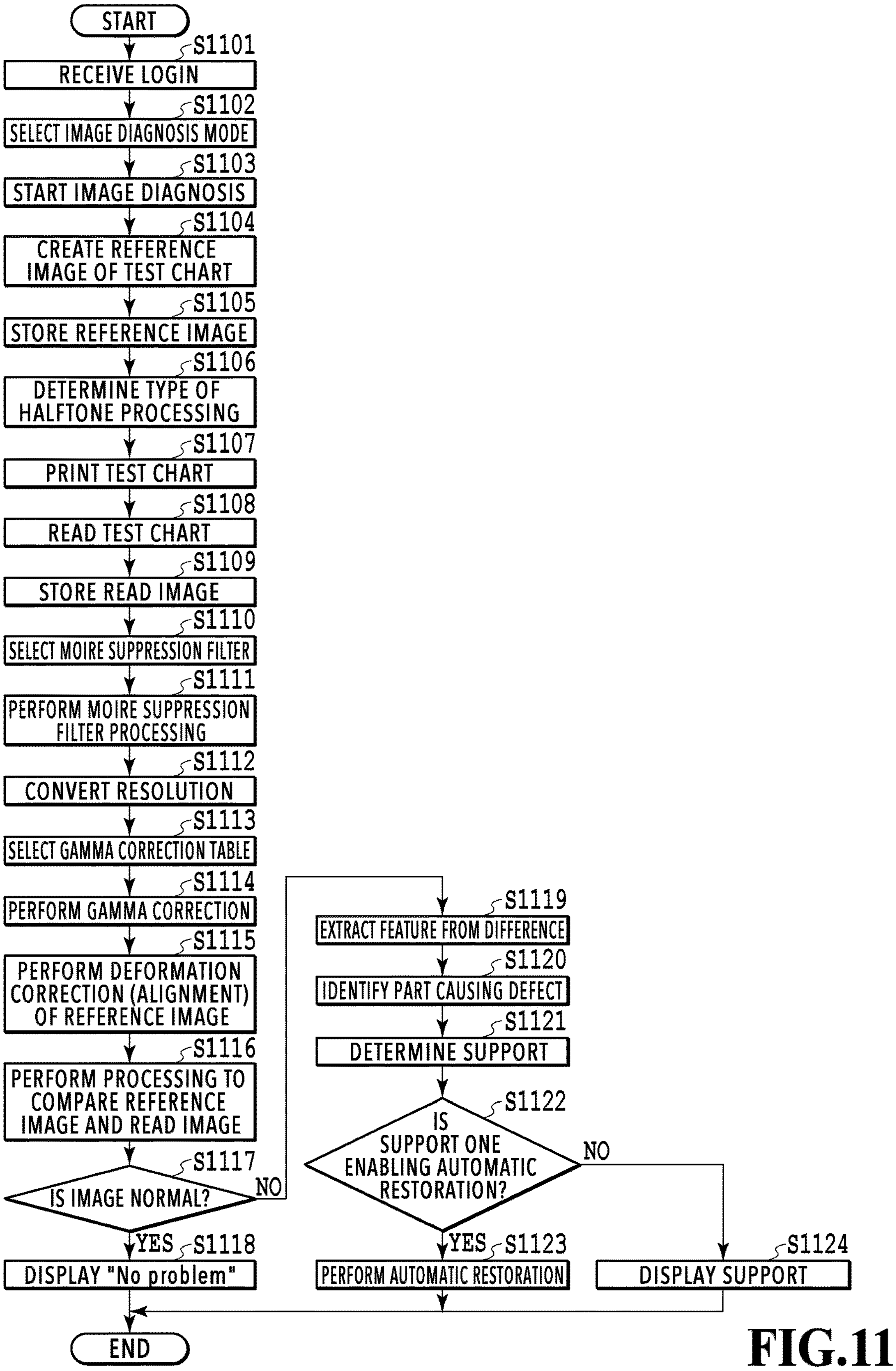
FIG. 11 is a flowchart showing a procedure of image diagnosis processing.
Figure 12:
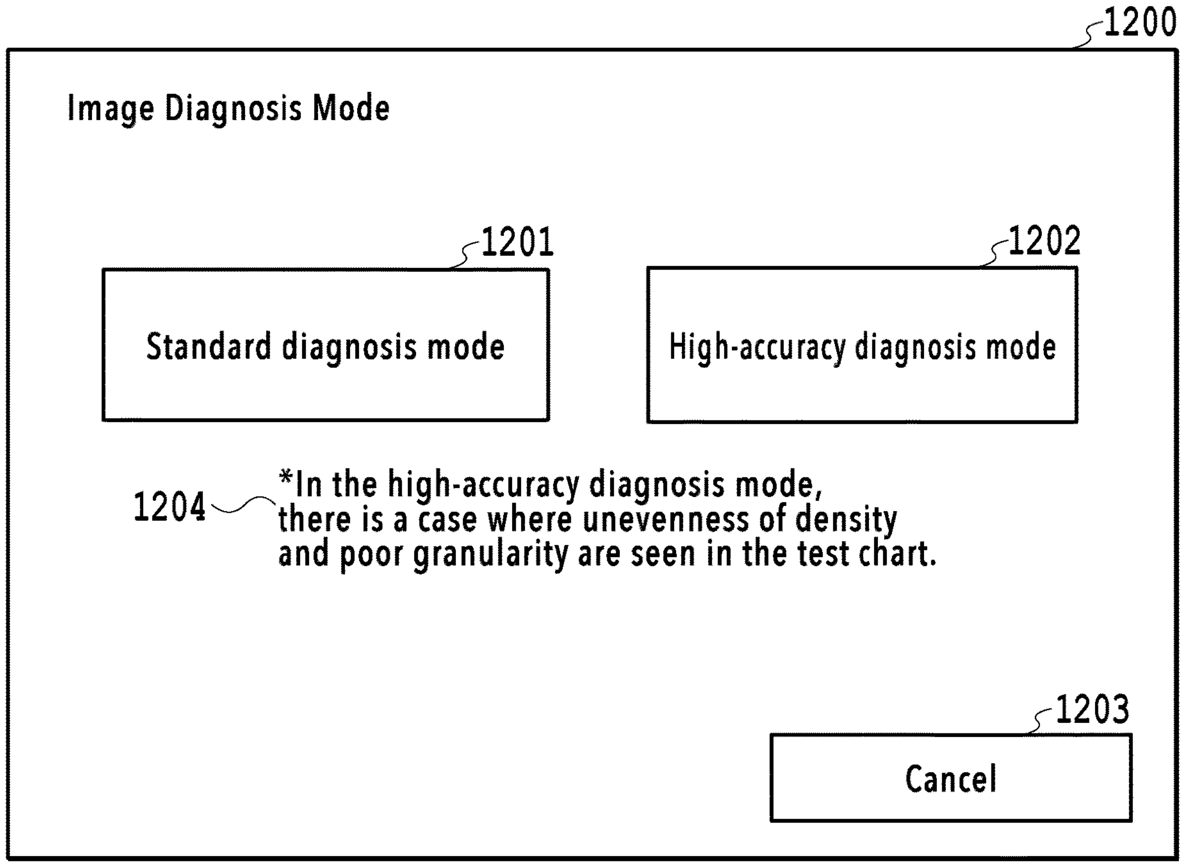
FIG. 12 is a diagram showing a UI screen example for selecting an image diagnosis mode.

Image diagnosis processing according to the present embodiment is explained by using the drawings. FIG. 11 is a flowchart showing a procedure of image diagnosis processing according to the present embodiment. FIG. 12 is a diagram showing a UI screen example for selecting an image diagnosis mode.

At S1101, the printing system 100 of the present embodiment receives login. Due to this, in a case where login by a user is received, the standard diagnosis mode is set automatically and it is no longer possible to select the high-accuracy diagnosis mode that is provided to a service person. Because of that, S1102, to be described later, is skipped. Further, at S1109, to be described later, a moire suppression filter that is set in advance in correspondence to the standard diagnosis mode is selected. At S1112, to be described later, a gamma correction table that is set in advance in correspondence to the standard diagnosis mode is selected.

At S1102, the printing system 100 of the present embodiment receives selection of a mode of image diagnosis, which is one of the standard diagnosis mode and the high-accuracy diagnosis mode, via the UI display unit 241 that is used also as the operation unit. Then, instructions to perform the image diagnosis based on the selected image diagnosis mode are given. A selection screen 1200 that is displayed on the UI display unit 241 is a screen for selecting an image diagnosis mode as shown in FIG. 12. On the selection screen 1200, a touch portion 1201 on which "Standard diagnosis mode" is described, a touch portion 1202 on which "High-accuracy diagnosis mode" is described, and a touch portion 1203 on which "Cancel" is described are displayed. The touch portion 1201 of "Standard diagnosis mode" is a button receiving a user operation for selecting the standard diagnosis mode. The touch portion 1202 on which "High-accuracy diagnosis mode" is described is a button receiving a user operation for selecting the high-accuracy diagnosis mode. The touch portion 1203 on which "Cancel" is described is a button receiving a user operation for exiting from the screen on which to select the image diagnosis mode in a case where the image diagnosis mode is not selected and the like.

Further, on the selection screen 1200, a caution display portion 1204 advising a caution regarding the diagnosis mode is displayed. For example, on the caution display portion 1204, a message, such as "*In the high-accuracy diagnosis mode, there is a case where unevenness of density and poor granularity are seen in the test chart.", is displayed. The above-described high-accuracy diagnosis mode is a mode that supposes execution by an educated operator or a service person. The above-described standard diagnosis mode is a mode that supposes execution by a user. In a case where execution instructions are given, at S1103, the printing system 100 starts image diagnosis processing based on the selection results at S1102. In a case where login of a user is received at S1101, image diagnosis processing in correspondence to the standard diagnosis mode is started.

At S1104, the CPU 251 of the external controller 102 reads the test chart stored in advance and rasterizes it into a bitmap, and creates the bitmap, which is the rasterized test chart, as a reference image. Then, at S1105, the CPU 251 temporarily stores the reference image of the test chart, which is created at S1104, in the HDD unit 253 of the external controller 102. After that, the reference image of the test chart stored in the HDD unit 253 is sent to the inspection module 109 and stored in the HDD unit 216 of the inspection module 109. The following explanation is given on the assumption that the resolution of the reference image of the test chart is 600 dpi.

At S1106, the control unit 300 determines the type of halftone processing that is performed for the YMCK image data of the test chart. At this time, the type of halftone processing is determined based on the selected image diagnosis mode. In a case where the standard diagnosis mode is selected, screen processing is determined, which uses the screen type applied to the image portion of the print image by a user. In the printing apparatus of the present embodiment, a low screen ruling is set to the image portion as the standard setting and screen processing using a low screen ruling is determined. On the other hand, in a case where the high-accuracy diagnosis mode is selected, error diffusion processing with a resolution of 1,200 dpi is determined. Then, at 51107, the CPU 251 transmits the bitmap data of the rasterized test chart from the video I/F 258 to the video I/F 205 of the printing module 107 through the video cable 106. The CPU 206 of the printing module 107 performs the halftone processing determined at S1106 for the bitmap data of the test chart, which is received by the video I/F 205, and prints the test chart in the print unit 203 based on the image data for which the halftone processing has been performed.

At S1108, the CPU 214 of the inspection module 109 performs processing to read the printed test chart by the image reading units 331 and 332. At S1109, the CPU 214 stores the read image of the test chart, which is read at S1108, in the HDD unit 216 of the inspection module 109 as the inspection image. In the present embodiment, the following explanation is given on the assumption that the resolution in a case where the printed test chart is read by the image reading units 331 and 332 is 600 dpi.

At S1110, the CPU 214 selects a filter that is used in the processing at S1111 and which is a filter in accordance with the screen type of the test chart for suppressing the occurrence of moire. At S1111, the CPU 214 performs filter processing for suppressing the occurrence of moire for the read image of the printed material (test chart), which is read at S1108, by using the filter for suppressing the occurrence of moire, which is selected at S1110. At S1112, the CPU 214 performs processing to convert resolution for the read image of the printed material (test chart) for which the filter processing has been performed. Due to this, the resolution of the read image of the printed material (test chart) for which the filter processing has been performed is converted to 300 dpi.

At S1113, the CPU 214 selects a lookup table in accordance with the screen type from the lookup tables stored in the memory 215 so that the gradation of the reference image created at S1104 matches that of the read image into which converted at S1112. At S1114, the CPU 214 performs gamma correction processing using the lookup table selected at S1113.

At S1115, the CPU 214 performs deformation correction of the reference image and performs alignment of the read image and the reference image for which the deformation correction has been performed at S1115. At S1116, the CPU 214 performs processing to compare the reference image of the test chart and the read image, whose conditions, such as resolution, have been matched. In a case where the image comparison processing is completed, at S1117, the CPU 214 determines whether or not the printed image (test chart image) is normal based on the comparison results of the reference image and the read image by the comparison processing, as in the defect inspection processing.

In a case where the CPU 214 obtains determination results that the printed image is normal (YES at S1117), the processing is moved to S1118. At S1118, the CPU 214 displays the image diagnosis results indicating that there is no problem on the UI display unit 241 of the inspection module 109. For example, the CPU 214 displays "No problem". On the other hand, in a case where the CPU 214 obtains determination results that the printed image is not normal (there is a defect in the image) (NO at S1117), the processing is moved to S1119. At S1119, the CPU 214 performs feature extraction for the image defect that remains as the difference data in a case where the comparison processing of the reference image and the read image is performed at S1116.

At 51120 to 51124, as in the first embodiment, the part that causes the image defect is identified from the extracted feature and support in accordance with the identification results is performed. In a case where the processing at one of S1118, S1123, and 51124 is completed, the flow (image diagnosis processing) shown in FIG. 11 is terminated.

[Effects]

In the error diffusion processing with a resolution of 1,200 dpi, compared to the case of the screen processing using a low screen ruling, the variations of the shape feature of the image defect due to the relative position of the dot pattern in the halftone image portion and the image defect become small and stable. On the other hand, with the dot pattern obtained by the error diffusion processing with a resolution of 1,200 dpi, the area of each dot becomes small and dot reproducibility becomes unstable. Because of this, a reduction in image quality becomes more likely to surface, such as density unevenness of halftone and deterioration of granularity, which is different from the image defect that is detected in defect inspection processing. As a result of that, even in a situation in which the reduction in image quality such as that described above does not occur and no support is necessary with the screen type a user uses for the printed material, there is a possibility that it is obliged to perform support because there is a reduction in image quality of the test chart by the error diffusion processing.

Consequently, it is made possible to perform the image diagnosis by one of the standard diagnosis mode and the high-accuracy diagnosis mode in which halftone image data represented by a dot pattern whose frequency is relatively high is generated for the halftone image portion of the test chart as explained above. Then, in the high-accuracy diagnosis mode, a message to the effect that a reduction in image quality occurs at part of the halftone image portion is displayed. Due to this, it is possible to restore the operation of the printing system rather quickly and it is possible to determine that support for a reduction in image quality accompanying the processing in the high-accuracy diagnosis mode is not necessary.

Further, in the present embodiment, in the high-accuracy diagnosis mode, though the halftone image data generated by performing the error diffusion processing with a resolution of 1,200 dip is used for the halftone image portion of the test chart, the halftone image data is not limited to this. It may also be possible to use halftone image data generated by performing error diffusion processing with a resolution of 1,200 dpi or more for the halftone image portion of the test chart. It may also be possible to use halftone image data generated by performing screen processing using a high screen ruling of 212 lines or more. In this case, compared to a case where halftone image data generated by performing screen processing using a low screen ruling is used, it is possible to stably extract the defect shape, and therefore, useful.

Third Embodiment

The printing system according to the present embodiment is explained. In the second embodiment, the aspect is explained in which it is possible to select one of the standard diagnosis mode and the high-accuracy diagnosis mode for the halftone image portion of the test chart. In the present embodiment, an aspect is explained in which the processing shown below is performed in a case where the image defect detected in the image diagnosis using a screen that a user uses in printing for the halftone image portion of the test chart is one in which the density of the defective portion thereof becomes low. That is, an aspect is explained in which the image diagnosis is performed, in which the halftone image data represented by a dot pattern whose frequency is relatively high is used for the halftone image portion of the test chart. The configuration of the printing system according to the present embodiment is the same as that of the first embodiment and explanation thereof is omitted.

[Image Diagnosis Processing]

Figure 13:
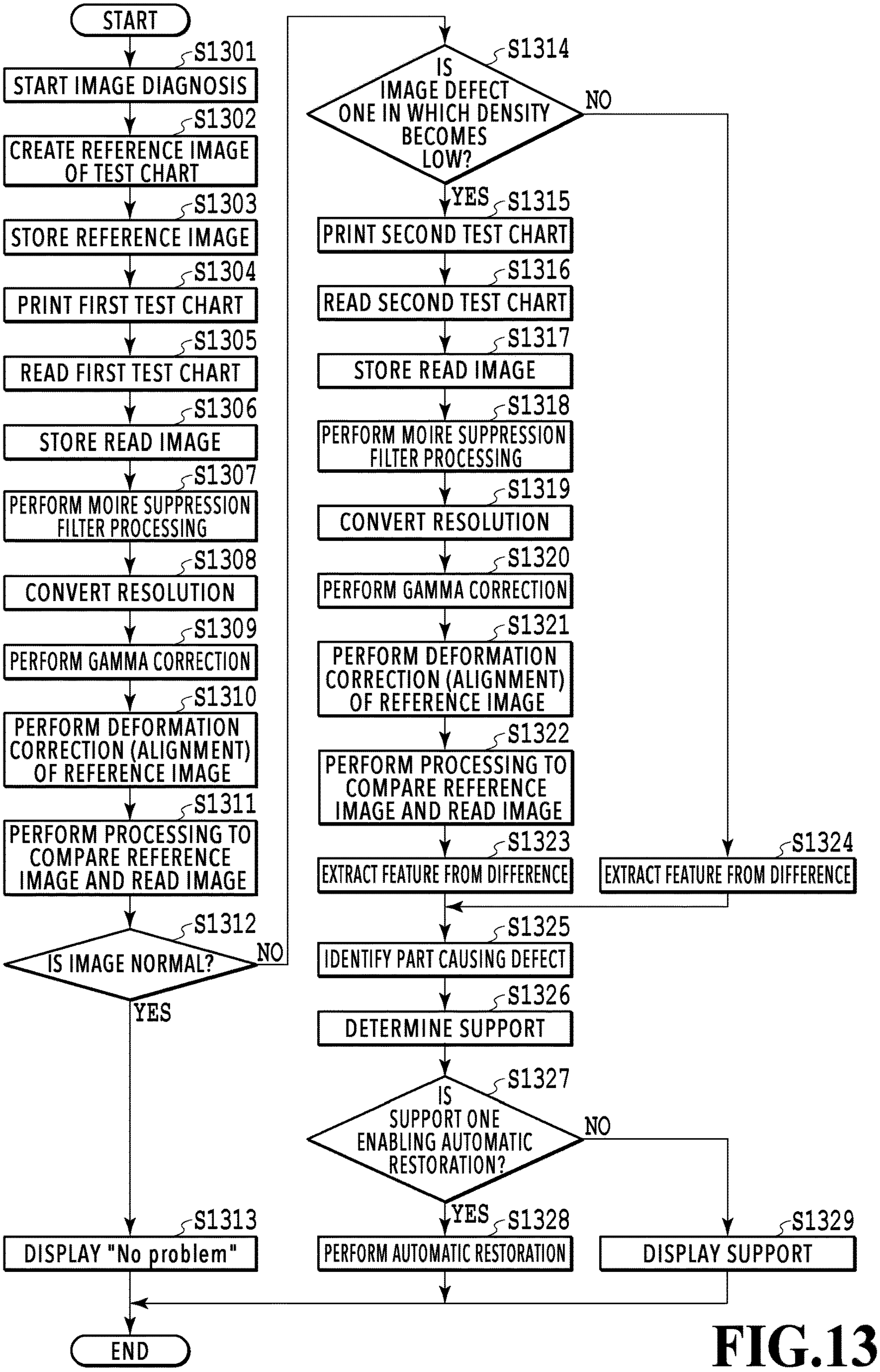
FIG. 13 is a flowchart showing a procedure of image diagnosis processing.

Image diagnosis processing according to the present embodiment is explained by using the drawing. FIG. 13 is a flowchart showing a procedure of image diagnosis processing according to the present embodiment.

At S1301, in a case of receiving image diagnosis instructions by a user or a service person via the UI display unit 241 that is used also as the operation unit, the printing system 100 of the present embodiment starts image diagnosis processing. At S1302, the CPU 251 of the external controller 102 reads the test chart stored in advance and rasterizes the test chart into a bitmap, and creates the bitmap obtained by rasterizing the test chart as a reference image. At S1303, the CPU 251 temporarily stores the reference image of the test chart, which is created at S1302, in the HDD unit 253 of the external controller 102. After that, the reference image of the test chart stored in the HDD unit 253 is sent to the inspection module 109 and stored in the HDD unit 216 of the inspection module 109. The following explanation is given on the assumption that the resolution of the reference image of the test chart is 600 dpi.

At S1304, the CPU 251 transmits bitmap data of the rasterized test chart from the video I/F 258 to the video I/F 205 of the printing module 107 through the video cable 106. Here, as halftone processing, screen processing is performed, which uses a low screen ruling that is set to the printing module 107 of the present embodiment as the standard setting, which is a screen type that a user applies to the image portion of the print image. The CPU 206 of the printing module 107 performs halftone processing for the bitmap data of the test chart received by the video I/F 205 and prints a first test chart in the print unit 203 based on the image data for which the halftone processing has been performed. That is, as the halftone processing, the screen processing using a low screen ruling is performed.

At S1305, the CPU 214 of the inspection module 109 performs processing to read the printed first test chart by the image reading units 331 and 332. At S1306, the CPU 214 stores the read image of the first test chart, which is obtained by the reading at S1305, in the HDD unit 216 of the inspection module 109 as the inspection image. In the present embodiment, the following explanation is given on the assumption that the resolution in a case where the printed first test chart is read by the image reading units 331 and 332 is 600 dpi.

At S1307, the CPU 214 performs filter processing for suppressing the occurrence of moire for the read image of the printed material (first test chart), which is obtained by the reading at S1305. At S1308, the CPU 214 performs processing to covert resolution for the read image of the printed material (first test chart) for which the filter processing has been performed. Due to this, the resolution of the read image of the printed material (first test chart) for which the filter processing has been performed is converted to 300 dpi. At S1309, the CPU 214 performs gamma correction processing using a lookup table stored in the memory 215 of the inspection module 109 so that the gradation of the reference image created at S1302 matches that of the read image into which converted at S1308.

At S1310, the CPU 214 performs deformation correction of the reference image and performs alignment of the read image and the reference image for which the deformation correction has been performed at S1310. At S1311, the CPU 214 performs processing to compare the reference image of the first test chart and the read image, whose conditions, such as resolution, have been matched. In a case where the image comparison processing is completed, at S1312, the CPU 214 determines whether or not the printed image is normal based on the comparison results of the reference image and the read image by the comparison processing, as in the defect inspection processing.

In a case where the CPU 214 obtains determination results that the printed first test chart is normal (YES at S1312), the processing is moved to S1313. At S1313, the CPU 214 displays the image diagnosis results indicating that there is no problem on the UI display unit 241 of the inspection module 109. On the other hand, in a case where the CPU 214 obtains determination results that the printed first test chart is not normal (there is a defect in the image) (NO at S1312), the processing is moved to S1314.

Further, at S1314, the CPU 214 determines whether or not the detected defect is a defect in which density becomes low (white void is also included). In a case where determination results that there is a defect in which density becomes low are obtained (YES at S1314), the processing is moved to S1315. In a case where determination results that there is not a defect in which density becomes low are obtained (NO at S1314), the processing is moved to S1324. Specifically, at S1314, the CPU 214 finds a difference as comparison processing between the reference image and the read image and converts the RGB image of the difference into a luminance Y, and determines that the defect is an image detect in which the density of the defective portion becomes low in a case where the luminance of the signal of the defective portion that remains as the difference is high. On the contrary, in a case where the luminance of the signal is low, it is determined that the defect is an image defect in which the density of the defective portion becomes high.

At S1315, the CPU 251 transmits the bitmap data of the rasterized test chart from the video I/F 258 to the video I/F 205 of the printing module 107 through the video cable 106. Here, as the halftone processing, error diffusion processing with a resolution of 1,200 dpi or more is performed. The CPU 206 of the printing module 107 performs the halftone processing for the bitmap data of the test chart received by the video I/F 205 and prints a second test chart in the print unit 203 based on the image data for which the halftone processing has been performed. That is, as the halftone processing, the error diffusion processing with a resolution of 1,200 dpi or more is performed.

At S1316, the CPU 214 of the inspection module 109 performs processing to read the printed second test chart by the image reading units 331 and 332. At S1317, the CPU 214 stores the read image of the second test chart, which is obtained by the reading at S1316, in the HDD unit 216 of the inspection module 109 as the inspection image. In the present embodiment, the following explanation is given on the assumption that the resolution in a case where the printed second test chart is read by the image reading units 331 and 332 is 600 dpi.

At S1318, the CPU 214 performs filter processing for suppressing the occurrence of moire for the read image of the printed material (second test chart), which is obtained by the reading at S1316. At S1319, the CPU 214 performs processing to covert resolution for the read image of the printed material (second test chart) for which the filter processing has been performed. Due to this, the resolution of the read image of the printed material (second test chart) for which the filter processing has been performed is converted to 300 dpi. At S1330, the CPU 214 performs gamma correction processing using a lookup table in accordance with error diffusion, which is stored in the memory 215 of the inspection module 109, so that the gradation of the reference image created at S1302 matches that of the read image into which converted at S1319.

At S1321, the CPU 214 performs deformation correction of the reference image and performs alignment of the read image and the reference image for which the deformation correction has been performed at S1321. At S1322, the CPU 214 performs processing to compare the reference image of the second test chart and the read image, whose conditions, such as resolution, have been matched. In a case where the image comparison processing is completed, at S1323, the CPU 214 performs feature extraction for the image defect that remains as the difference data in a case where the comparison processing of the reference image and the read image of the second test chart is performed at S1322.

At S1324, the CPU 214 performs feature extraction for the image defect that remains as the difference data in a case where the comparison processing of the reference image and the read image of the first test chart is performed at S1311.

At S1325 to S1329, as in the first embodiment, the part that is the cause of the image defect is identified from the extracted feature and support in accordance with identification results is performed. In a case where the processing at one of S1313, S1328, and S1329 is completed, the flow (image diagnosis processing) shown in FIG. 13 is terminated.

[Effects]

With the error diffusion processing with a resolution of 1,200 dpi or more, compared to a case where screen processing using a low screen ruling is performed, the variations of the shape of the linear or spot-shaped image defect, such as an image defect in which the density of the halftone image portion becomes low and a white void image defect, become small and stable. Because of this, the type of halftone processing that is used for the test chart is selected in accordance with the feature of a defect and this is useful from the viewpoint of a reduction in the number of test charts and stability of feature extraction of an image defect.

Consequently, in a case where the image defect detected in the image diagnosis using a screen that a user uses in printing for the halftone image portion of the test chart is one in which the density of the defective portion thereof becomes low as explained above, a predetermined image diagnosis shown below is performed. That is, an image diagnosis is performed, which uses halftone image data represented by a dot pattern whose frequency is relatively higher for the halftone image portion of the test chart. Due to this, it is possible to restore the operation of the printing system rather quickly and, to reduce the number of test charts to be used and perform a stable image diagnosis.

Further, in the present embodiment, though the halftone image data generated by the error diffusion processing with a resolution of 1,200 dpi or more is used for the halftone image portion of the second test chart, the halftone image data is not limited to this. It may also be possible to use halftone image data generated by the screen processing using a high screen ruling of 212 lines or more and compared to a case of the screen processing using a low screen ruling, it is possible to stably extract the defect shape, and therefore, useful.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to stably identify a failure component of an image forming apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-145523, filed Sep. 13, 2022, which is hereby incorporated by reference wherein in its entirety.

What is claimed is:

1. An image forming apparatus having a failure diagnosis function, the image forming apparatus comprising:

a generating unit configured to generate a halftone image by performing halftone processing for an input image;

an obtaining unit configured to obtain a scanned image of a printed material on which the halftone image is printed; and an identification unit configured to identify a failure component of the image forming apparatus based on a difference between the scanned image and the input image, wherein the generating unit generates the halftone image by representing a dot pattern of a halftone portion in a case where the input image is a test image for the failure diagnosis by a dot pattern whose frequency is relatively higher than that of a dot pattern that is applied to the halftone portion in a case where the input image is an image other than the test image.

2. The image forming apparatus according to claim 1, wherein the generating unit generates the halftone image by representing the dot pattern of the halftone portion in a case where the input image is the test image by a dot pattern that is applied to a text portion of a print image.

3. The image forming apparatus according to claim 1, wherein the generating unit generates the halftone image by representing the dot pattern of the halftone portion in a case where the input image is an image other than the test image by screen processing using a predetermined screen ruling that is applied to an image portion of a print image.

4. The image forming apparatus according to claim 1, wherein the generating unit generates the halftone image in a case where the input image is the test image by performing screen processing using a screen whose ruling is 212 lines or more or error diffusion processing with a resolution of 1,200 dpi or more.

5. The image forming apparatus according to claim 1, comprising:

a setting unit configured to set a high-accuracy diagnosis mode for diagnosing the image forming apparatus with high accuracy, wherein the generating unit generates the halftone image in a case where the input image is the test image on a condition that the high-accuracy diagnosis mode is set.

6. The image forming apparatus according to claim 1, wherein the generating unit generates the halftone image in a case where the input image is the test image on a condition that a defective portion in which density becomes low is extracted from the difference.

7. The image forming apparatus according to claim 1, wherein the identification unit extracts at least one of a color feature amount and a shape feature amount from the difference and identifies a failure component of the image forming apparatus based on the extracted color feature amount or the shape feature amount.

8. The image forming apparatus according to claim 1, comprising:

a gamma correction unit configured to perform gamma correction for at least one of the test image and the scanned image in a case where the input image is the test image.

9. The image forming apparatus according to claim 8, wherein the gamma correction unit performs gamma correction by using a correction table in accordance with a screen type that is used for the halftone portion of the test image.

10. The image forming apparatus according to claim 1, further comprising:

a suppression unit configured to suppress the occurrence of moire for the scanned image.

11. The image forming apparatus according to claim 10, wherein the suppression unit suppresses the occurrence of the moire by using a filter in accordance with a screen type that is used for the halftone portion of the test image.

12. The image forming apparatus according to claim 1, further comprising:

an inspection unit configured to inspect a defect of the printed material based on a difference between the input image and the scanned image.

13. A control method of an image forming apparatus having a failure diagnosis function, the control method comprising:

a generation step of generating a halftone image by performing halftone processing for an input image;

an obtaining step of obtaining a scanned image of a printed material on which the halftone image is printed; and an identification step of identifying a failure component of the image forming apparatus based on a difference between the scanned image and the input image, wherein at the generation step, the halftone image is generated by representing a dot pattern of a halftone portion in a case where the input image is a test image for the failure diagnosis by a dot pattern whose frequency is relatively higher than that of a dot pattern that is applied to the halftone portion in a case where the input image is an image other than the test image.

14. A non-transitory computer readable storage medium storing a program for causing a computer to execute a control method of an image forming apparatus having a failure diagnosis function, the control method comprising:

a generation step of generating a halftone image by performing halftone processing for an input image;

an obtaining step of obtaining a scanned image of a printed material on which the halftone image is printed; and an identification step of identifying a failure component of the image forming apparatus based on a difference between the scanned image and the input image, wherein at the generation step, the halftone image is generated by representing a dot pattern of a halftone portion in a case where the input image is a test image for the failure diagnosis by a dot pattern whose frequency is relatively higher than that of a dot pattern that is applied to the halftone portion in a case where the input image is an image other than the test image.

* * * * *